United States Patent
Kazmi

(10) Patent No.: US 9,538,434 B2
(45) Date of Patent: Jan. 3, 2017

(54) METHOD AND ARRANGEMENT IN A WIRELESS COMMUNICATION SYSTEM

(75) Inventor: Muhammad Kazmi, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1061 days.

(21) Appl. No.: 13/639,038

(22) PCT Filed: Jul. 14, 2010

(86) PCT No.: PCT/SE2010/050842
§ 371 (c)(1),
(2), (4) Date: Oct. 2, 2012

(87) PCT Pub. No.: WO2011/126420
PCT Pub. Date: Oct. 13, 2011

(65) Prior Publication Data
US 2013/0028126 A1 Jan. 31, 2013

Related U.S. Application Data

(60) Provisional application No. 61/321,371, filed on Apr. 6, 2010.

(51) Int. Cl.
*H04W 36/00* (2009.01)
*H04W 24/10* (2009.01)
(Continued)

(52) U.S. Cl.
CPC ......... *H04W 36/0088* (2013.01); *H04W 24/10* (2013.01); *H04W 72/1257* (2013.01); *H04W 84/045* (2013.01)

(58) Field of Classification Search
None
See application file for complete search history.

(56) References Cited

U.S. PATENT DOCUMENTS

| | | | |
|---|---|---|---|
| 8,660,559 B2 * | 2/2014 | Tamura | H04W 36/30 455/436 |
| 2002/0163976 A1 * | 11/2002 | Karthaus | G06K 7/0008 375/295 |

(Continued)

FOREIGN PATENT DOCUMENTS

SE  WO 2009096846 A1 * 8/2009 ............ H04W 24/10

OTHER PUBLICATIONS

NTT DOCOMO, "Inter-frequency/RAT Measurement Gap Control," 3GPP TSG RAN WG1 and WG2 Joint Meeting, R2-060841, Athens, Greece, Mar. 31, 2006, pp. 1-6.

(Continued)

*Primary Examiner* — Ayaz Sheikh
*Assistant Examiner* — Faiyazkhan Ghafoerkhan
(74) *Attorney, Agent, or Firm* — Murphy, Bilak & Homiller, PLLC

(57) ABSTRACT

According to some embodiments of the invention, a method is provided in a radio network node for scheduling data transmission and/or reception. According to the method, the radio network node predicts (530) at least one autonomous gap occurrence in which user equipments served by the radio network node will use autonomously created gaps for acquiring system information from a neighboring base station and during which the UE is not able to receive data from, and/or transmit data to, the radio network node. Furthermore, the radio network node schedules (560) a user equipment for data transmission and/or reception in a time period which does not overlap with any predicted autonomous gap occurrence.

18 Claims, 12 Drawing Sheets

(51) Int. Cl.
*H04W 72/12* (2009.01)
*H04W 84/04* (2009.01)

(56) References Cited

U.S. PATENT DOCUMENTS

| | | | | |
|---|---|---|---|---|
| 2004/0002334 | A1* | 1/2004 | Lee | H04W 36/0083 455/436 |
| 2004/0208148 | A1* | 10/2004 | Cooper | H04W 72/044 370/336 |
| 2004/0258017 | A1* | 12/2004 | Beard | H04B 7/2656 370/329 |
| 2006/0068831 | A1* | 3/2006 | Stewart | H04W 52/40 455/522 |
| 2006/0126713 | A1* | 6/2006 | Chou | H04L 47/10 375/225 |
| 2007/0097914 | A1* | 5/2007 | Grilli | H04W 36/0088 370/329 |
| 2009/0046641 | A1* | 2/2009 | Wang | H04W 74/002 370/329 |
| 2009/0135787 | A1* | 5/2009 | Uemura | H04W 24/10 370/335 |
| 2009/0168662 | A1* | 7/2009 | Tsuboi | H04L 1/20 370/252 |
| 2009/0176490 | A1* | 7/2009 | Kazmi | H04J 11/0093 455/434 |
| 2009/0191862 | A1* | 7/2009 | Amirijoo | H04W 36/0083 455/424 |
| 2009/0235139 | A1* | 9/2009 | Park | H04L 1/1819 714/750 |
| 2009/0239533 | A1* | 9/2009 | Somasundaram | H04J 11/0093 455/434 |
| 2009/0275326 | A1* | 11/2009 | Lee | H04W 48/08 455/422.1 |
| 2009/0318090 | A1* | 12/2009 | Flordelis | H04L 5/0007 455/67.13 |
| 2010/0003979 | A1* | 1/2010 | Iwamura | H04L 1/0025 455/436 |
| 2010/0034126 | A1* | 2/2010 | Kitazoe | H04W 74/085 370/310 |
| 2010/0034158 | A1* | 2/2010 | Meylan | H04L 1/1854 370/329 |
| 2010/0296410 | A1* | 11/2010 | Kazmi | H04W 24/10 370/252 |
| 2010/0297955 | A1* | 11/2010 | Marinier | H04W 36/0061 455/73 |
| 2010/0304682 | A1* | 12/2010 | Choi | H04B 7/024 455/63.1 |
| 2010/0309803 | A1* | 12/2010 | Toh | H04L 1/0006 370/252 |
| 2010/0322169 | A1* | 12/2010 | Narasimha | H04W 72/0493 370/329 |
| 2011/0085448 | A1* | 4/2011 | Kuwahara | H04W 16/10 370/242 |
| 2011/0189998 | A1* | 8/2011 | Joo | H04W 24/00 455/444 |
| 2011/0237272 | A1* | 9/2011 | Gorokhov | H04B 7/024 455/452.1 |
| 2012/0033595 | A1* | 2/2012 | Aoyama | H04W 76/048 370/311 |
| 2012/0106450 | A1* | 5/2012 | Golitschek Edler Von Elbwart | H04L 1/003 370/328 |
| 2012/0281563 | A1* | 11/2012 | Comsa | H04W 24/10 370/252 |
| 2013/0028126 | A1* | 1/2013 | Kazmi | H04W 36/0088 370/252 |
| 2014/0206341 | A1* | 7/2014 | Siomina | H04W 36/0088 455/422.1 |
| 2015/0117283 | A1* | 4/2015 | Wei | H04W 36/0088 370/311 |

OTHER PUBLICATIONS

Sharp, "Measurement Gap Control for E-UTRAN," 3GPP TSG-RAN WG2#56, R2-063283, Riga, Latvia, Nov. 10, 2006, pp. 1-4.
QUALCOMM Europe, "Connected mode inbound mobility for HeNBs," 3GPP TSG-RAN WG2 #67, R2-094304, Aug. 28, 2009, Shenzhen, China, pp. 1-4.
Ericsson, "HeNB Inbound Mobility Requirements in DRX," 3GPP TSG-RAN WG4 Ad hoc Meeting #10-02, R4-101243, Dublin, Ireland, Apr. 16, 2010, pp. 1-2.

* cited by examiner

EXAMPLE CELLS

EXAMPLE RA METHOD AT BASE STATION

METHOD AND ARRANGEMENT IN A WIRELESS COMMUNICATION SYSTEM

TECHNICAL FIELD

The present disclosure relates generally to a method and an arrangement in a network node. In particular, it relates to scheduling of data transmission and/or reception.

BACKGROUND

Femto base stations, also called home base stations, have attracted much interest recently in the wireless industry. The standardization process for home base stations is ongoing in 3GPP for Universal Terrestrial Radio Access (UTRA), Evolved UMTS Radio Access (E-UTRA) and Worldwide Interoperability for Microwave Access (WiMAX). Furthermore, in both UTRA and E-UTRA, advanced features related to home base stations such as mobility procedures, interference management and control etc are also being introduced. Home base stations are already operational in other technologies such as Global System for Mobile communication (GSM) and 3GPP2 CDMA technologies (e.g. CDMA2000 1×RTT and High Rate Packet Data, HRPD).

In legacy UTRAN specifications, four classes of base stations (BS) are defined, namely the wide area BS that serves macro cell deployment, the medium range BS that serves micro cell deployment, the local area BS that serves pico cell deployment and the home base station serving the private localized premises, like a home or an office. In UTRAN, the home BS is also called a home NodeB (HNB). In E-UTRAN specifications three classes of base stations are defined; Wide area BS, local area BS and home base station. In E-UTRAN the home BS is also called a Home eNodeB (HeNB).

A home base station may also be referred to as a home access point, femto base station, femto access point, home NodeB, or home eNodeB. Some particular examples of Home Base Stations are UTRAN FDD/TDD home NodeB, E-UTRAN TDD/FDD home eNB (eNodeB), GSM home base station, CDMA2000 1×home BS, HRPD home BS, or WiMAX home base station. For simplicity and consistency, we will use the term home base station (HBS) in the rest of the disclosure. This term is intended to covers all types of home access points, including but not limited to those mentioned above. It should be understood that a home base station may not only deployed in a private residence, but also in other public or private premises such as shopping malls, office buildings, etc.

Depending on the operator, a Home Base Station may share the carrier with macro, micro or pico base stations, i.e. non home base stations. This may be referred to as a mixed carrier scenario. Alternatively, the HBS may be assigned a carrier which is used only for the operation of home base stations, i.e. a dedicated carrier scenario.

One main difference between a home base station and other base station classes is that a Home Base Station is assumed to be owned by a private subscriber, who has the liberty to install it at any location. Thus, strict network planning is not possible in case of Home Base Station deployment. This is in contrast to other base station classes, which are deployed by an operator according to well-defined principles. The lack of precise network planning of Home Base Stations and their dense deployment may have the following consequences:

High interference towards other base stations, including other home BSs and the surrounding network, e.g. macro base stations.

In case of dense Home BS deployment, the UE may detect, measure and report a large number of cells, which are served by home base stations but are not required for mobility.

Access to a home base station may be under the control of the operator or the owner of the home base station. The access control mechanism for a home BS decides if a given user may or may not connect to that home base station. The selection of the access control mechanism has a large impact on the performance of the overall network, mainly due to its role in the definition of interference. In UTRAN and E-UTRAN, the concept of a Closed Subscriber Group (CSG) exists. According to the CSG concept, only a subset of users, defined by the owner of the home base station, are allowed to connect to that particular home base station. Because access to a HBS may be restricted only to certain users, appropriate mobility procedures to prevent unnecessary handovers towards the non-allowed home base stations are specified for UTRAN as well as for E-UTRAN. This implies that before initiating a handover to a neighbor cell, the serving network node may need to know whether the target cell is a CSG cell or not, i.e. whether the target cell is served by a HBS using the CSG concept.

Currently, network deployments with several layers comprising macro base stations, pico base stations, home base stations etc are gaining popularity. In certain areas, coverage from macro layer deployment overlaps with areas covered by micro, pico or femto network deployments. Such a network or deployment is called a heterogeneous network. These heterogeneous network scenarios are expected to become more and more popular as a direct consequence of the proliferation of pico, femto, and home eNBs. In such heterogeneous network deployments, mobility management is becoming an even more challenging task, because it is quite probable that Physical Cell Identities, PCIs, are frequently reused. Hence, a serving node in many cases may have to know whether the target cell belongs to a macro, pico or home base station etc.

Thus, in a scenario with home base stations, as well as in heterogeneous networks, it is beneficial to uniquely determine the identity and/or type of potential target cells. This requires information which is transmitted in the cell's system information. Hence, the user equipment (UE) is expected to acquire system information from surrounding base stations, such as neighboring HBSs, and report this information to the network. One example of system information that the UE may need to acquire is the Cell Global Identifier (CGI), which is a unique identifier of a cell. The CGI or E-UTRAN CGI (ECGI) acquisition is typically performed by the UE in response to an explicit request received from the serving network node. One example scenario where this may occur is when the UE performs neighbor cell measurements on potential target cells for handover, i.e. to support mobility.

As part of the neighbor cell measurement procedure, the UE will send a measurement report containing neighbor cell measurements such as Reference Symbol Received Power (RSRP) and/or Reference Symbol Received Quality (RSRQ) in E-UTRAN, or Common Pilot Channel Received Signal Code Power (CPICH RSCP) and/or Common Pilot channel received energy per chip divided by power spectral density (CPICH Ec/No) in UTRAN. The serving network node typically uses these measurements to determine if the UE would be better served by one of the neighbor cells, i.e. whether to initiate a handover (HO).

The measurement report also comprises the physical cell identity (PCI) of the target cell to the serving network node, e.g. the serving eNodeB in E-UTRAN. The PCI is an identity which identifies the target cell, but it is typically not unique within the network. In current E-UTRAN specifications, for instance, there are only 504 different PCIs defined. This is because the PCI is broadcast at frequent intervals in the cell, so its length is restricted to only a few bytes in order to consume less radio resources. As a consequence, in a large network the same PCI may need to be reused in several cells and is therefore not guaranteed to be unique, or even to uniquely identify the type of the cell. In a dense Home Base Station deployment scenario, the PCIs are more frequently reused, due to the large number of cells and smaller cell sizes.

Therefore, in a situation where the serving network node is not able to derive the necessary information from the PCI, the serving network node may also request the UE to decode and report the Cell Global Identifier (CGI) of the target cell. For example, based on the reported PCI, the network node may suspect that the target cell belongs to a CSG, a Home Base Station or to any similar node as part of the heterogeneous network. In order to prevent a HO command to a non-allowed Home Base Station, e.g. a CSG cell to which the UE does not have access, the serving network node needs to be able to uniquely identify the cell, or at least determine with certainty whether the cell is served by a HBS or not, and in particular whether it is associated with a CSG. However, since the PCI is not unique, the network node cannot establish this based on the PCI alone. The CGI, however, is an identity which is unique in the network, thereby allowing the network to distinguish between macro BSs and home BSs, or to uniquely identify that the reported cell is associated with a CSG. Hence, to confirm its hypothesis that the target cell is served by a HBS, the network may request the UE to decode and report the target cell's CGI or ECGI.

The procedure and the associated requirements for the UE reporting of the target cell's CGI or ECGI are specified in both UTRAN and E-UTRAN. One key aspect of the CGI decoding is that it is performed by the UE during autonomous gaps, which are created by the UE itself. During the autonomous gaps, the UE interrupts its reception and transmission of data in the serving cell. The reason for acquiring the target cell CGI during autonomous gaps is that the typical UE implementation is not capable of simultaneously receiving data from the serving cell and acquiring the target cell's system information, which contains the CGI. Furthermore, the CGI acquisition of an inter-frequency or inter-Radio Access Technology (inter-RAT) target cell requires the UE to switch carrier frequency, which means it cannot communicate with the serving cell at the same time. Hence, the use of autonomous gaps is necessary for acquiring the target cell's CGI. These autonomous gaps are also interchangeably referred to as measurement occasions, because the gaps are the occasions during which the UE measures the CGI of the target cell.

The CGI is sent over a system information block (SIB). In E-UTRAN, the CGI is called E-UTRAN CGI (ECGI), and is transmitted in system information block type 1 (SIB1). However, the acquisition of ECGI requires the UE to first read the master information block (MIB) of the target cell, which is transmitted on the physical broadcast channel (PBCH) with a periodicity of 40 ms. Within the 40 ms period, the PBCH is repeated in every frame. For example, in E-UTRAN, the length of an E-UTRAN frame is 10 ms, and the PBCH will be repeated in every fourth frame. The MIB enables the UE to acquire information such as system frame number (SFN), cell transmission bandwidth etc. Hence, after acquiring the MIB, the UE reads the system information block type 1 (SIB1), which contains the ECGI and is transmitted with a periodicity of 80 ms on DL-SCH. The home eNodeB can be deployed on a shared carrier or on a dedicated carrier as described earlier. Therefore EGCI requirements in E-UTRAN are specified for the following two scenarios:

Intra-frequency ECGI reporting
Inter-frequency ECGI reporting

The UE is required to report the intra-frequency ECGI within about 200 ms, including processing time of the measurement request, after receiving a request from the serving network node, for a target intra-frequency cell provided that the target cell's SINR experienced by the UE is at least −6 dB or higher, and to report an inter-frequency ECGI within about 200 ms, including processing time of the measurement request, provided that the target cell's SINR is at least −4 dB or higher. During the acquisition of the target cell's ECGI on the serving carrier frequency the UE is allowed to create autonomous gaps in the downlink. Those gaps result in interruptions in the UE downlink reception from the serving node, and uplink transmission to the serving node. That is to say, the UE cannot receive signals from or transmit signals to its serving node during an autonomous gap. The duration of the autonomous gap may vary depending upon the UE implementation, but typically comprises 3 sub-frames.

In UTRAN, the CGI is transmitted in the system information block type 3 (SIB3). But in order to read the SIB3 the UE has to first read the MIB. Hence the UE can determine the CGI of a neighbor cell by reading its MIB and system information block type 3 (SIB3), which are sent on the broadcast channel (BCH). The MIB is transmitted every 20 ms. The SIB3 may have different periodicity, which is configured by the network. As compared to E-UTRAN, in UTRAN the target cell's CGI acquisition time is typically much longer, e.g. more than 1 second depending upon the periodicity of the SIB3. Furthermore, due to the autonomous gaps created by the UE to acquire the target cell's CGI, the interruption of the data transmission and reception from the serving cell can be 600 ms or longer.

The concepts of autonomous gaps and CGI/ECGI acquisition are also relevant for self organizing networks (SON). The SON function in E-UTRAN and UTRAN allows the operator to automatically plan and tune the network parameters and network nodes. The conventional method is based on manual tuning, which consumes enormous amounts of time and resources, and requires considerable involvement of work force. Due to network complexity, a large number of system parameters, Inter-Radio Access Technologies (IRAT) etc., it is very attractive to have reliable schemes to perform the test of self organization in the network whenever necessary.

An operator may also add or delete a cell or an entire base station, which may serve multiple cells. Especially new cells are added more frequently during an early phase of network deployment. In the later stages, an operator can still upgrade the network by adding more carriers or more base stations on the same carrier. It can also add cells related to another technology. The network may automatically detect the new cells and their relationship to existing cells in a process referred to as automatic neighbor cell relation (ANR) establishment, which it is part of the self organizing network (SON) functionality. In order to ensure correct establishment of the neighbor cell relation, the serving cell requests the UE to report the CGI of the new target cell, whose PCI is identified and reported to the said serving cell. The CGI acquisition requires the UE to read the target cell's system information and is thus carried out by the UE during autonomous gaps. As in the case of home inbound mobility, the CGI acquisition for ANR purposes also leads to interruption of data from the serving cell.

As explained above, the UE autonomously creates measurement gaps for acquiring the system information of the target cell to decode its CGI in home BS inbound mobility scenarios, for ANR purposes, or in any similar scenario. In other words, the length (L) of the measurement gaps and number (N) of measurement gaps depend upon the UE itself. No signaling or any related information about the autonomous gaps is exchanged between the UE and the serving network node. Since the serving network node is unaware of the exact occasions and number of autonomous gaps created by the UE, it does not know when the UE can be conveniently scheduled without losing data due to the gaps.

One solution to this problem is to not allow the serving network node to schedule the UE during the entire time while the UE is acquiring system information, e.g. decoding the CGI, of a target cell. As mentioned above, this period is about 200 ms in E-UTRAN and may be over one second in UTRAN. Thus, this solution leads to a long interruption in the transmission/reception between the serving cell and the UE while the target cell's CGI decoding is performed. This may cause significant degradation of real time services such as voice.

Another prior art solution is to use an aggressive approach, i.e. to continue scheduling the UE during the period when the UE is acquiring system information from other cells, without any regard for the autonomous gaps. A drawback of this approach is that if the UE receives an uplink grant which coincides with an autonomous gap, the UE will not be able to use the grant. Thus, the associated uplink resources, which could potentially have been assigned to another UE, will be wasted. If a downlink transmission to the UE coincides with an autonomous gap, the UE will not receive the information and retransmission will be required.

The performance degradation resulting from these drawbacks may be significant, in particular in a dense home base station scenario or in heterogeneous networks, where there are many potential target cells for the UE to measure on. It is therefore important to minimize the duration of the data interruption from the serving cell while the UE is acquiring system information, in particular CGI or ECGI.

There is thus a need in the art for improving the performance of wireless communication systems, in particular in a scenario when UEs may need to acquire system information from neighboring cells.

SUMMARY

It is an object of at least some embodiments of the invention to improve performance by providing a scheduling mechanism, which is able to take into account autonomous gaps created by the UE.

Some embodiments of the present invention provide a solution to the above problem, whereby a serving network node is able to determine at what instances the gaps are autonomously created by the UE for the acquisition of the system information. This determination allows the network to schedule the UE based on its knowledge of when the UE is acquiring the target cell's system information.

According to one embodiment, the present invention comprises a method implemented in a radio network node. The method comprises the steps of:
  Requesting the UE to identify the system information of the target cell,
  Acquiring at least one UE measurement report of the said target cell,
  Determining, based on the said acquired measurement report, the occasions or time instances during which the UE is not acquiring the system information of the said target cell, and
  Scheduling the UE for data reception and/or transmission during the time instances when UE is not acquiring the system information.

Particular embodiments of the invention enable the serving network node to predict or determine the autonomous gaps created by the UE for acquiring the target cell's system information, which contains the CGI. This prediction makes it possible for the serving network node to schedule the UE in the time periods when there is no autonomous gap, which may contribute to performance improvement and/or better utilization of resources.

Other particular embodiments provide a method in a radio network node for scheduling data transmission and/or reception. According to the method, the radio network node predicts at least one autonomous gap occurrence in which user equipments served by the radio network node will use autonomously created gaps for acquiring system information from a neighboring base station, and during which the UE is not able to receive data from, and/or transmit data to, the radio network node. The radio network node then schedules a user equipment for data transmission and/or reception in a time period which does not overlap with any predicted autonomous gap occurrence.

Other particular embodiments provide a method in a radio network node serving a user equipment. According to the method, the radio network node receives information from the user equipment, which indicates at least one autonomous gap occurrence, during which the user equipment will autonomously create gaps for acquiring system information from a neighboring base station. Furthermore, the radio network node predicts at least one autonomous gap occurrence in which user equipments served by the radio network node will use autonomously created gaps for acquiring system information from the neighboring base station. The radio network node then schedules a user equipment for data transmission and/or reception in a time period which does not overlap with any predicted autonomous gap occurrence.

Another embodiment provides a radio network node comprising one or more processing circuits, which are configured to predict at least one autonomous gap occurrence in which user equipments served by the radio network node will use autonomously created gaps for acquiring system information from a neighboring base station and during which the UE is not able to receive data from, and/or transmit data to, the radio network node. Furthermore, the processing circuits are configured to schedule a user equipment for data transmission and/or reception in a time period which does not overlap with any predicted autonomous gap occurrence.

Another embodiment provides a radio network node comprising one or more processing circuits, which are configured to receive information from a user equipment being served by the radio network node. The information indicates at least one autonomous gap occurrence, during which the user equipment will autonomously create gaps for acquiring system information from a neighboring base station. The processing circuits are further configured to predict at least one autonomous gap occurrence in which user equipments served by the radio network node will use autonomously created gaps for acquiring system information from the neighboring base station. Furthermore, the processing circuits are configured to schedule a user equipment for data transmission and/or reception in a time period which does not overlap with any predicted autonomous gap occurrence.

Another embodiment provides a method in a user equipment, which is being served by a radio network node. According to the method, the user equipment performs a measurement on a signal received from a neighboring base station. Based on this measurement, the user equipment determines at least one autonomous gap occurrence during which the user equipment will autonomously create gaps for acquiring system information from the neighboring base station. The user equipment then transmits information to the radio network node, indicating the at least one autonomous gap occurrence.

In another embodiment, a user equipment comprising one or more processing circuits is provided. The processing circuits are configured to perform a measurement on a signal received from a neighboring base station, and to determine, based on the measurement, at least one autonomous gap occurrence during which the user equipment will autonomously create gaps for acquiring system information from a neighboring base station. The processing circuits are further configured to transmit information to the radio network node serving the user equipment, the information indicating the at least one autonomous gap occurrence.

An advantage of some embodiments is that the serving cell interruption while the UE acquires the CGI of the target cell is minimized, since the serving cell can still schedule the UE during the occasions when there are no gaps. This is made possible because the radio network node predicts the autonomous gap occurrences that the UE will use to acquire system information from the target cells.

A further advantage is that the scheduling grant issued by the serving cell to the UE is not wasted since the serving cell knows when the UE can transmit and/or receive the data when it is acquiring the system information of the target cell.

Furthermore, the performance degradation of delay sensitive services such as voice over IP can be minimized by reducing the interruption in scheduling the packets.

LIST OF ABBREVIATIONS

Figure 1:
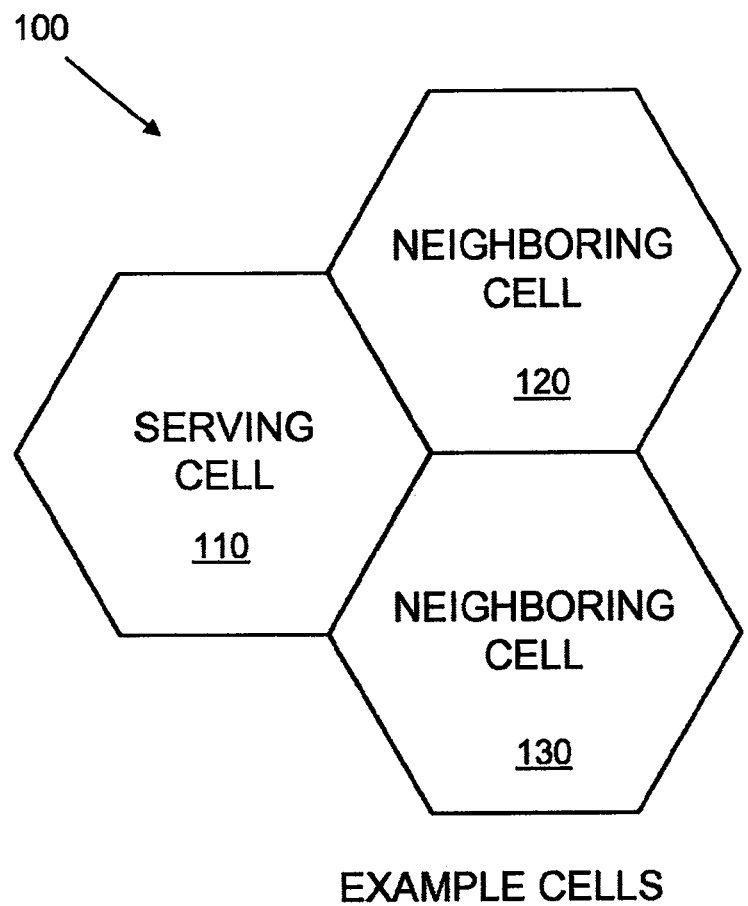
FIG. 1 is a schematic diagram illustrating a wireless network.

CPICH: Common pilot channel
CSI Channel state information
E-UTRAN: Evolved UTRAN
GPS: Global Positioning System
RSRP: Reference symbol received power
RSRQ: Reference symbol received quality
UE: User Equipment
UTRAN: Universal Terrestrial Radio Access Network
WCDMA: Wide band code division multiple access
SON: Self organizing network
CGI: Cell global identifier
PCI: Physical cell identifier
ANR: Automatic neighbor relation

DETAILED DESCRIPTION

It should be noted that although terminology from 3GPP UTRAN, also known as 3G, and E-UTRAN, also known as Long Term Evolution (LTE), has been used in this disclosure to exemplify the invention, this should not be seen as limiting the scope of the invention to only the aforementioned system. Other wireless systems, including other WCDMA-based systems, WiMax, Ultra Mobile Broadband (UMB) and GSM, may also benefit from exploiting the ideas covered within this disclosure.

As explained above, the use of autonomous gaps for acquiring system information may result in service interruption and performance degradation of the ongoing communication between the serving cell and the UE. However, typically the autonomous gaps created by the UE are short, sporadic and sometimes occur periodically. This implies that the network could in principle still maintain active communication with the UE, i.e. transmit and/or receive data, while the UE is acquiring the CGI of a neighbor cell, provided that the communication takes place in the time periods when there is no gap—that is, the serving network node may more intelligently schedule transmissions to or from the UE, based on knowing or at least predicting, with some accuracy, when the measurement gaps are likely to occur.

This disclosure uses the terms "occurrence", "occasion", and "timing" interchangeably when referring to the UE measurement gaps. Herein, "timing" should be broadly construed to include the times and/or positions of measurement gaps, in an absolute or relative sense (e.g., with respect to synchronized frames), and/or the number, duration, and/or periodicity of such gaps.

The term "autonomous gap occurrence", when used in this disclosure, refers to a time instance or a time period, determined or selected by the UE, when a user equipment is not able to receive data from its serving network node, because the user equipment is acquiring information from another node, e.g. a neighboring base station. In some cases the UE may also not be able to transmit data to its serving network node during the autonomous gap occurrence. As explained above, the time instance or time period may be defined in various different ways, for instance as a starting and ending subframe number, or a starting subframe number and a length, either in milliseconds or in terms of number of subframes. The autonomous gap occurrence may also be defined only by its starting point, e.g. starting subframe number. In this case the length of the gap occurrence may be predefined, e.g. the gap length may be assumed to always be 3 subframes.

The following non-limiting example is intended to illustrate the potential improvement in terms of resource utilization, if the serving network node would be able to predict the autonomous gap occurrences of the UE. It is first recalled that in E-UTRAN, the UE is required to acquire and report the CGI of a neighbor cell within about 200 ms, including processing time of the measurement request command. Since the neighbor BS will be transmitting the MIB and SIB1 (which contains CGI) once every 40 ms and 80 ms respectively, there will be either four or five possible occurrences when the UE may attempt to acquire the CGI within this 200 ms period. The contents of MIB and SIB1 are repeated every 10 ms and 20 ms during 40 ms and 80 ms periods respectively. This enables UE to improve the decoding performance by soft combining the MIB and SIB1 information up to 4 times within their respective periods. The UE reads MIB and SIB1 in tandem. This is because in order to read SIB1 the UE needs to know some fundamental system parameters like cell transmission bandwidth, system frame number (SFN) etc, which are transmitted in MIB. Assuming that the UE creates an autonomous gap at each CGI transmission occurrence, and each gap is three subframes in length, this means that autonomous gaps will occur only in a total of 12 or 24 subframes, corresponding to 12 or 24 ms out of the entire 200 ms measurement period (the length of a subframe in E-UTRAN is 1 ms). Thus, if the network node would be able to accurately predict when the gaps would occur, it could schedule transmissions to or from the UE in the remaining 200−24=176 ms.

In some embodiments of the invention, the serving network node predicts the autonomous gap occurrences based on the knowledge or assumption that the UE will only create a gap when the required system information, e.g. the Master Information Block (MIB), the required SIB (i.e. SIB1 in E-UTRAN and SIB3 in UTRAN) containing CGI etc, is actually being transmitted in the neighbor cell, e.g. a target cell for handover. Thus, in the serving network node may predict the autonomous gap occurrences by determining timing information for the neighboring base station, and then deducing from the timing information when the required system information, e.g. the ECGI, will be transmitted. That is to say, the serving network node assumes that the timing of the autonomous gaps in the UE coincides with the timing of the transmission of the required system information in the neighbor cell. Various methods that the serving network node may use for determining timing information for neighboring base stations are set forth in this disclosure.

In other embodiments, the gaps are predicted based on the absence or presence of an expected transmission from the UE. For instance, if the serving network node does not receive an expected Channel State Information (CSI) report from the UE, or if it does not receive HARQ ACK/NACK feedback following a downlink transmission, the serving network node may assume that an autonomous gap occurred, preventing the UE from receiving or transmitting information. Conversely, if the serving network node does receive feedback from the UE, it may assume that there was no gap created during that particular time period. This information may be used to predict future autonomous gap occurrences, assuming that the gaps recur periodically.

FIG. 1 is a schematic diagram illustrating a wireless network 100 in which some embodiments of the invention may operate. The wireless network 100 comprises three cells 110, 120, 130. A UE may make measurements to determine system information for one or more neighboring cells 120, 130, such as to enable reporting of the CGIs of those neighboring cells to its reporting cell, or serving cell, 110. Note that the uniformity of cells depicted in the drawing does not imply that the real-world network is so implemented, as different cell types/sizes may be involved. Regardless, according to particular embodiments of the present invention, scheduling of data transmissions to or from the UE is improved, based on determining the timing of service interruptions caused in the serving cell by the UE's measurements of neighboring cell system information.

Figure 2:
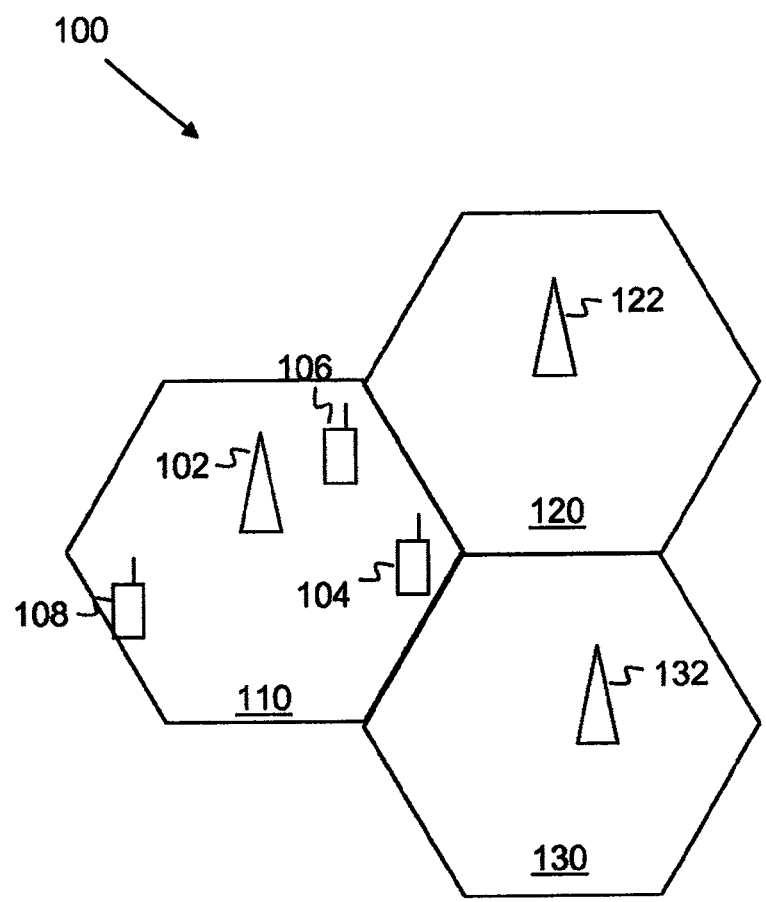
FIG. 2 is a schematic diagram showing a more detailed view of the wireless network of FIG. 1.

FIG. 2 is a schematic diagram which gives a more detailed view of the wireless network 100 shown in FIG. 1. Three UEs 104, 106 and 108 are present within the cell 110, and served by the serving base station 102. Neighboring cell 120 is served by base station 122, and neighboring cell 130 is served by base station 132. The base stations 102, 122, and 132 periodically transmit system information, which can be decoded by UEs located within the cell coverage area. It is to be understood, with respect to all embodiments set forth herein, that this particular example scenario is not to be construed as limiting, and that the exemplified methods and arrangements may be applied in a network comprising any number of cells, with any number of UEs being served by each cell. It is further pointed out that while the example scenario in FIG. 2 shows a single network node serving each cell, it is equally possible for one network node to serve several cells or sectors.

Figure 3:
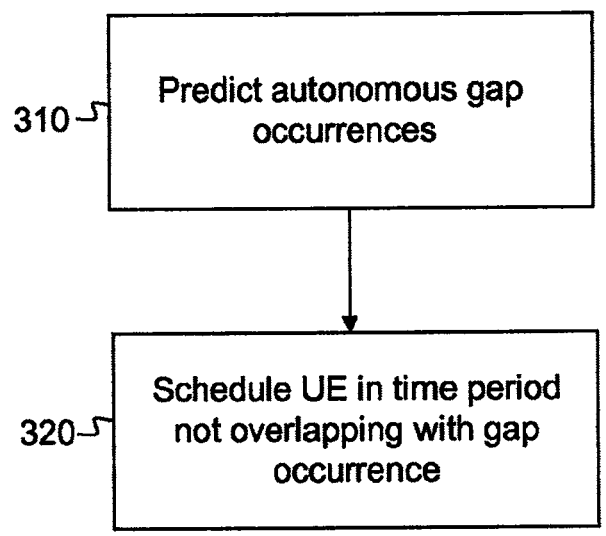
FIG. 3 is a flow chart illustrating a method in a network node according to some embodiments.

Referring to FIG. 2 and the flowchart of FIG. 3, a general method for scheduling data transmission and/or reception according to one embodiment will now be described. The method is performed in a network node 102, e.g. an E-UTRAN eNodeB or an UTRAN RNC. In a first step 310, the network node 102 predicts at least one autonomous gap occurrence in which user equipments 104, 106, 108 served by the network node 102 will use autonomously created gaps for acquiring system information from a neighboring base station 122. During such an autonomous gap occurrence, the user equipment creating the gap is not able to receive data from, and/or transmit data to, the serving network node 102. In a further step 320, the network node 102 schedules a user equipment 104 for data transmission and/or reception in a time period which does not overlap with any predicted autonomous gap occurrence. In other words, the network node 102 schedules the UE in the non-gap periods.

Figure 4:
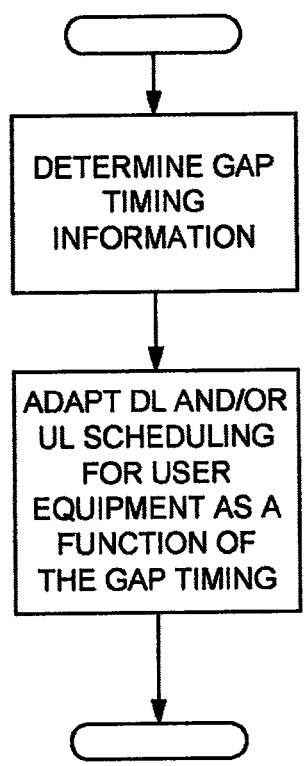
FIG. 4 is a flow chart illustrating a method according to an embodiment.

Another general method according to some embodiments is illustrated in FIG. 4. According to this method, a base station determines gap timing information, and then adapts the downlink and/or uplink scheduling for a user equipment as a function of the gap timing. The expression "gap timing" as used in FIG. 4 corresponds to "autonomous gap occurrence" in FIG. 3.

In particular embodiments of the invention, one may assume a scenario whereby in active mode, e.g. RRC_CONNECTED mode in E-UTRAN, the serving network node, e.g. serving eNode B in E-UTRAN, requests that the UE:

Read the system information of at least one target cell or neighbor cell, which may operate over the intra-frequency carrier, inter-frequency carrier or may belong to another Radio Access Technology (RAT).

Acquire CGI of the target cell or neighbor cell by reading the system information of the target cell during the measurement gaps, which are created autonomously by the UE without the intervention of the network.

Report the acquired CGI to the serving network node.

According to particular embodiments of the invention, a method in a network node is provided. The method comprises the steps of:

I. Determining, based on static/semi-static and dynamic information, the occurrence of at least one autonomous gap, which comprise at least one of the time instances (T0), the length (L) and the number of autonomous gaps which are to be created by the UE while acquiring system information, such as the CGI of a particular target cell.

II. Using the determined knowledge in step I) to determine when the UE can be scheduled without interruption due to the autonomous gaps.

III. Scheduling the UE while taking into account the determined knowledge.

The subsequent sections describe the use of static, semi-static and dynamic information for the determination of the occurrence of autonomous gaps according to some embodiments.

The occurrence of gaps may be determined by using static and/or semi-static information. By static and semi-static information we mean the information which may change over a longer time scale e.g. in the order ranging from hours to several days. This type of information can typically be stored in a database, such as at the time of network planning.

The following pieces of static or semi-static information are gathered by the network and one or more elements of this information can be combined with other information to determine various details related to the occurrence of the autonomous gaps:

Scheduling of system information (e.g. SFN, MIB and SIB1) in the neighboring cells.

In case of an asynchronous network, the Frame Start Timing of the neighboring cells or the time offset between the frame timing of the serving and the neighbor cells or similar information. In some cases, the network may already have this information, if it supports positioning services such as observed time difference of arrival (OTDOA).

In case of a synchronous network, the accuracy of the frame start timing between the cells and also the cell size, e.g. cell range or cell radius, of the serving and the neighbor cells, because the accuracy between any two cells depends upon the overlapping area between them.

UE receiver type or receiver capability information either explicitly, i.e. by UE indication/capability reporting or implicitly, which is based on the UE reported measurement data/results, i.e. based on past UE reported statistics. This information indicates whether the UE has a baseline receiver or an advanced receiver, e.g. an interference cancellation receiver.

As mentioned above, the UE creates gaps only when the required system information (e.g. MIB, the required SIB containing CGI etc) are transmitted in the target cell. After synchronization to the target cell and acquisition of the SFN, the UE will only read the necessary SIB which contains the target cell CGI.

Thus, the above information enables the network to determine the potential time instances (T0) of the occurrences of the autonomous gaps that can be created by the UE for obtaining the CGI of the target cell, assuming the target cell is at the lowest SNR for which the requirements are specified (e.g. SNR=−6 dB in case of E-UTRAN intrafrequency).

The static and semi-static information discussed above provide information about the scheduling and transmission of the neighbor cells' system information, which for instance contains CGI of the neighbor cells. In addition, one or more out of the following set of dynamic information indicated below may be used to assist the network node in determining the number of autonomous gaps and also the length of each gap the UE may use in decoding the CGI of a particular target cell. This dynamic information comprises:

Signal quality of the target cell

Relative signal quality between the serving and the target cell

Time required for identifying the physical cell identity of the target cell

Received time difference between the serving and the target cell

HARQ ACK/NACK

Interruption in periodic CSI reports

Figure 5:
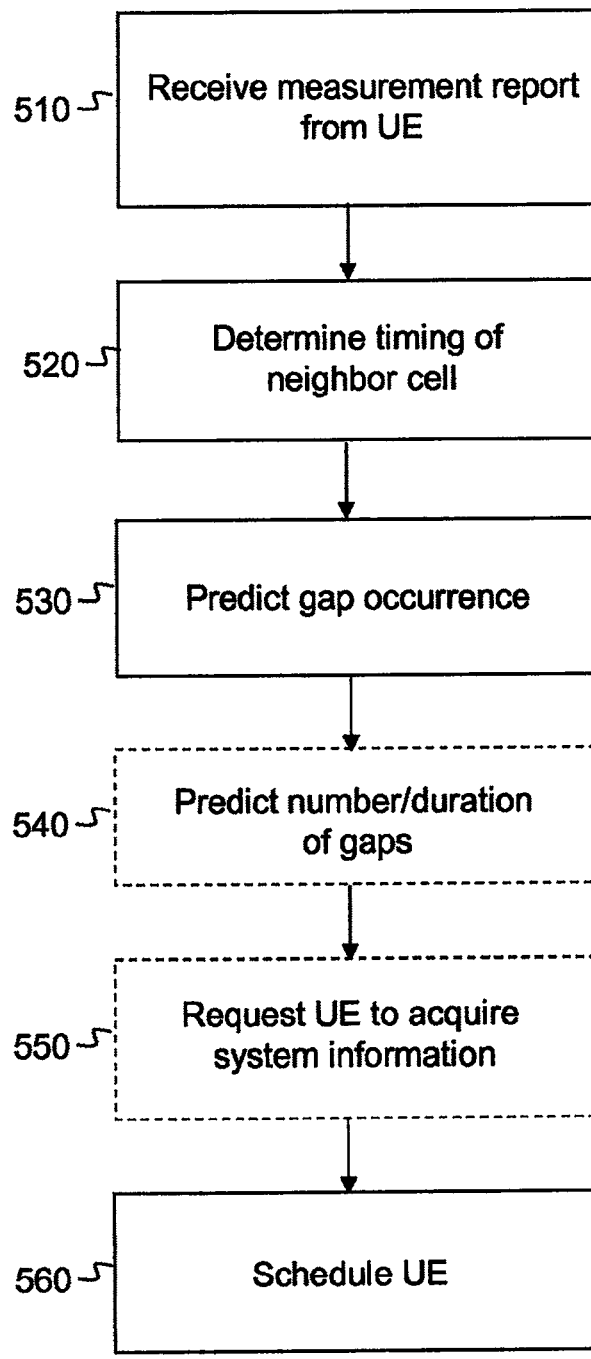
FIG. 5 is a flow chart illustrating a method in a base station according to some embodiments.

A method in a network node for scheduling data transmission and/or reception according to an embodiment of the invention will now be described, with reference to the example scenario of FIG. 2 and the flowchart in FIG. 5.

The method may be executed in a network node 102, comprised within a wireless communication network 100 as shown in FIG. 2. The network node 102 may for instance be an E-UTRAN eNodeB, or an UTRAN radio network node such as a NodeB or RNC. The network node 102 serves a cell 110, and within this cell three user equipments 104, 106, 108 are located. However, it should be understood that this scenario is not limiting—in particular, the network node 102 may serve more than one cell, and the cell 110 may comprise any number of user equipments.

In step 510, the network node 102 receives a measurement report from a reporting user equipment 104. The measurement report relates to the neighboring cell 120, served by base station 122. For instance, the measurement report could be a neighbor cell measurement report comprising the PCI of neighboring base station 122, as well as other information such as the signal-to-noise ratio, SNR, of neighboring base station 122 as experienced by UE 104.

In step 520, the network node 102 determines timing information for the neighboring base station 122 based on the measurement report received in step 510. The timing information comprises the frame start timing and/or the System Frame Number, SFN of neighboring base station 122. In one variant, the frame start timing and/or SFN are directly included in the measurement report received from the UE. In another variant, the timing information is determined based on the relative time difference between the serving base station 102 and the neighboring base station 122, as measured by the UE 104. Especially in an asynchronous network, the relative time difference between the serving and the target cell, as measured by the UE 104, may be used by the serving node 102 to determine the precise transmit timing of the target cell 120. Another possibility is that the serving base station or the serving radio network node determines the timing without user equipment measurement reports. In one variant the serving base station or the serving radio network node determines the timing information of the neighbouring base station from the message received from the said neighbouring base station or by any other network node. The received message contains at least the frame start timing and may also contain the SFN of the neighbouring base station. In yet another variant, the radio network node or the serving base station directly acquires the timing information of the neighbouring base station by performing correlation over a pre-defined set of synchronization and/or pilot signals transmitted by the neighbouring base station. In order to further acquire the SFN of the neighbour cell the radio network node has to also read at least part of the system information (e.g. MIB) of the neighbouring base station. This method requires that the radio network node is equipped with a receiver unit, which is capable of receiving signals transmitted by other radio network node such as base stations. Low power network nodes such as home base stations, relay nodes or pico base stations are generally equipped with a receiver to receive the signals from other base stations, in particular macro base stations.

The timing information determined in step 520 enables network node 102 to determine when the neighbor cell 120 is transmitting certain system information, such as a certain SIB, or more specifically the Cell Global Identifier, CGI, contained in SIB1 in E-UTRAN. This is because system information is transmitted periodically in certain predefined frames or subframes—for instance, as explained above, in E-UTRAN the MIB and SIB1 which contains the CGI are transmitted every 40 ms or every $4^{th}$ frame and every 80 ms or every $8^{th}$ frame respectively. Thus, by knowing the frame start timing and/or the current SFN of the neighboring base station 122, the network node 102 is able to determine at which future time instances or time periods the neighboring base station 122 will transmit its system information in neighbor cell 120. This information corresponds to the potential occasions or instances when the UE 104 could create autonomous gaps for acquiring the target cell's 120 CGI.

The network node 102 thus uses the determined timing information in a step 530 for predicting at least one autonomous gap occurrence for user equipments served by network node 102, which are acquiring system information from the neighbor cell 120. In this way, the network node 102 determines the starting point in time for one or more gap occurrences. However, the timing information does not reveal the duration of each gap, or the total number of gaps used by the UE 104 for acquiring the system information. The duration and number of gaps are preconfigured in this embodiment. For instance, the duration of each autonomous gap may be preconfigured to be 1, 2, 3, or 4 subframes.

Other preconfigured durations are also possible. As for the total number of gaps created, in this embodiment the network node 102 assumes that the user equipment will use the maximum possible number of autonomous gap occurrences in a measurement period for acquiring the system information such as CGI of the neighbouring base station. For instance, as mentioned above, during a measurement period of 200 ms there will be four or five possible autonomous gap occurrences, depending on when the UE starts to measure. In this embodiment the network node 102 will assume that all these occurrences will be used. It should be noted that it may be possible for the UE to decode the required system information faster, e.g. using only two out of four possible gap occurrences, in which case the network node 102 would unnecessarily avoid scheduling the UE during the remaining two or three gaps. However, this is not likely to cause any significant performance reduction.

In some variants of this embodiment, the network node 102 performs a further step 550, wherein the network node 102 requests a user equipment to acquire system information from the neighbouring base station 122. For example, if the network node 102 received a PCI in step 510, the network node 102 might determine based on the PCI that the neighboring base station 122 could be a Home Base Station, but that this cannot be determined with certainty based on the PCI alone. To confirm if the neighbor cell 120 really is a Home Base Station, the network node 102 may request UE 104 to also acquire the CGI of neighbor cell 120. However, it should be pointed out that after acquiring timing information for neighboring base station 122 from UE 104, the network node 102 could alternatively request another UE, e.g. UE 106 or 108, to acquire system information from neighboring base station 122. That is to say, network node 102 may use the timing information from UE 104 to predict the autonomous gap occurrences for any of the other UEs 106, 108 within cell 110.

In step 560, the network node 102 schedules a user equipment for data transmission and/or reception in a time period which does not overlap with any predicted autonomous gap occurrence. That is to say, the network node 102 avoids the gap occurrences during the measurement period when the UE is acquiring system information, by scheduling the UE in a time period that does not coincide with any of the gaps. In one particular variant, the network node 102 schedules the UE only in time periods that do not coincide or overlap with any of the predicted autonomous gap occurrences. It is pointed out that the user equipment to be scheduled in step 560 could be the reporting UE 104, i.e. the UE that sent the initial measurement report, but it could also be any other UE served by the network node 102, provided that the network node 102 is aware that this UE is currently in a measurement period during which it is attempting to acquire system information from the neighboring base station 122 using autonomous gaps. That is to say, the predicted gap occurrences for UE 104 may be used to schedule other UEs. In some variants, the serving network node 102 may gather statistics from several UEs in order to more accurately determine the timing of the neighboring base station 122.

A further embodiment of a method in a network node for scheduling data transmission and/or reception will now be described, also with reference to FIG. 5. This embodiment is based on the one described above. However, in this embodiment the duration and/or number of gap occurrences are not preconfigured. Instead, additional information is used to more precisely determine the gap occurrences, i.e., the number of gap instances and/or length, i.e. duration, of each instance.

Thus, in the present embodiment steps 510, 520, 530, and the optional step 550, are performed in the same way as described above.

However, this embodiment comprises an additional step 540, wherein the network node 102 predicts the duration and/or number of the autonomous gap occurrences that will be used by the UE 104 for acquiring system information from the neighbouring base station 122.

In some variants of this embodiment, the serving network node 102 predicts the duration and/or number of gap occurrences based on the SNR of the neighboring base station 122. At higher SNR (i.e. higher RSRQ) of the target cell 120, the UE requires fewer gaps to decode the CGI. On the other hand, at lower SNR level the UE may require more gaps, and in the worst case may require all possible gaps within the maximum allowed time. The network may maintain a predefined mapping between the SNR and the number of measurement gaps required for acquiring the CGI of the target cell for different UE receiver types. The duration of each gap depends on the SNR of neighbor cell 120 in a corresponding way. That is to say, at a higher SNR, the UE 104 may be able to decode the system information using fewer subframes than at a lower SNR. At lower SNR levels, a larger gap, i.e. a longer gap, might be needed due to higher noise level and imprecise received timing from a weak target cell.

The following paragraphs will describe several ways in which the serving network node 102 may determine the SNR of the neighboring base station 122.

In one variant, the serving network node 102 assumes the lowest allowed SNR of the target cell or neighbor cell 120 (e.g. SNR=−6 dB) to determine the number of measurement occasions, i.e. autonomous gap occurrences, for a particular receiver type based on the pre-defined mapping.

In another variant, the serving network node 102 determines the SNR based on a signal quality measurement. The signal quality reveals the SNR or signal strength of the target cell. Examples of such measurements are RSRQ and RSRP of the target cell in E-UTRAN and CPICH Ec/No and CPICH RSCP in UTRAN.

These signal quality metrics are generally reported with the PCI of the identified target cell in prior art. Alternatively, the serving network node can preconfigure the UE 104 to report one or more of these measurements whenever a new neighbor cell is identified. Thus, the serving network node 102 may receive one or more of these metrics as part of the measurement report received in step 510. In the present variant, one or more of these signal quality metrics is used in determining or predicting the occurrence of the service gaps, i.e. the autonomous gap occurrences, caused by the UE in decoding the CGI of the target cell. For instance, as mentioned above, the network can maintain a pre-defined mapping between the number of gaps required to decode CGI and the corresponding signal quality, e.g. SNR, RSRQ and RSRP. As stated earlier, the CGI acquisition requires the UE to decode MIB and SIB. Hence, separate pre-defined mapping tables for determining the gaps for decoding the MIB and SIB may be used in some embodiments. Such a mapping table may also be used to predict the size of each gap e.g. whether each gap should be 2 ms or 4 ms long. Hence using the reported measurement and mapping tables, the network node can determine when it is feasible to schedule the UE, i.e., when UE completes the acquisition of CGI. The reported measurement and the mapping table also reveal to the network, i.e. the serving network node 102, when the UE will complete the decoding of CGI. For example the UE may require lower overall delay compared to the minimum requirements in case of high SNR. Hence the network can predict when it can resume scheduling a UE which is performing CGI decoding.

In another variant, the serving network node 102 uses the relative quality between the serving cell 110 and the target cell 120 to determine the SNR. The UE 104 may be configured to report an event which is based on the comparison between the serving and target cell signal strength or quality, e.g. when the target cell signal quality is X dB above that of the serving cell 110. The UE 104 also reports the serving cell quality (e.g. RSRQ or RSRP). Using this set of information, the serving network node 102 may determine the target cell's 120 signal quality. The derived target cell quality can then be used to determine the number of measurement gaps and/or the length of each gap in time, required for acquiring system information, such as the CGI of the target cell 120. It is pointed out that the UE 104 may report the signal strength or quality of the neighboring base station 122 relative to that of the serving base station 102, or vice versa.

In yet another variant, the network node 102 uses the time required for identifying the PCI of the target cell to determine the signal quality level. For example, at high SNR levels (e.g. 0 dB) the UE 104 is able to identify the PCI of an unknown neighbor cell in about 50-100 ms in non-DRX, or for DRX in up to 40 ms. However, at a SNR level of −6 dB, the time required to identify the cell is about 800 ms in non DRX state. Thus, by knowing the delay in acquiring the PCI, the network node 102 may determine the target cell's 120 SNR, which is turn is used to find the number and/or size, i.e. duration, of each gap for acquiring system information, such as the CGI of that target cell 120, for example by using the pre-defined mapping table between SNR and number of gaps and/or length of gaps as described above.

In another variant, the serving network node 102 predicts the duration and/or number of autonomous gap occurrences based on the receiver capability of the user equipment. For instance, if the UE is equipped with a more advanced received, the network node 102 may assume that it is able to acquire system information using shorter and/or fewer gap occurrences. Advanced receivers, which may be employed in the user equipment, are generally capably of eliminating or minimizing the intra-cell interference or both intra-cell and inter-cell interference. Some of the advanced receivers that may be employed in the user equipment are also capable of eliminating or minimizing the inter-stream interference, which occurs due to the multi-stream transmission in case of Multiple Input Multiple Output (MIMO). These interference cancellation or minimization capabilities of the advanced receivers in the user equipment in turn enhance the measured SINR and enable the acquisition of the information in fewer decoding attempts, i.e. in a shorter time.

In another variant, the serving network node 102 uses knowledge of whether the serving radio base station and the neighboring base station operate on the same or different carrier frequencies to predict the duration of the autonomous gap occurrences. As explained above, the UE is required to switch carrier frequency in order to acquire system information, such as CGI, from an inter-frequency or inter-RAT target cell, and therefore a longer autonomous gap will typically be needed in such situations.

In at least one of the variants described above, the network schedules the UE in a step 560 to avoid sending and/or receiving during the times that the UE is reading the system information. In this regard, the network uses its knowledge of the timing, duration and number of the service gaps, i.e. autonomous gap occurrences, and schedules around those gaps, e.g., the serving node defers scheduling the UE until after the UE reads the system information. It is pointed out that the user equipment to be scheduled in step 460 could be the reporting UE 104, i.e. the UE that sent the initial measurement report, but it could also be any other UE served by the network node 102, provided that the network node 102 is aware that the UE is currently in a measurement period during which it is attempting to acquire system information from the neighboring base station 122 using autonomous gaps. That is to say, information acquired from one UE may be used to predict autonomous gap occurrences for other UEs. In some variants, the serving network node 102 may gather statistics from several UEs in order to more accurately determine the timing, duration and/or number of autonomous gap occurrences.

In some further variants, the serving network node 102 uses a predicted duration and/or number of gap occurrences, which has been determined based on measurements from a first UE, only for those other UEs which have similar capabilities as the first UE. and/or are located within a certain distance from the first UE. This is because UEs which have the same or similar receiver capabilities are more likely to require a similar duration and/or number of gaps for decoding, as explained above. Furthermore, UEs which are located closer to each other are more likely to experience a similar SNR with respect to neighboring base station 122, and consequently to require a similar duration and/or number of autonomous gaps, than UEs which are located further apart in the cell 110. Therefore, in this variant the network node 102 may be able to predict the duration and/or number of gap occurrences with even higher accuracy.

Figure 6:
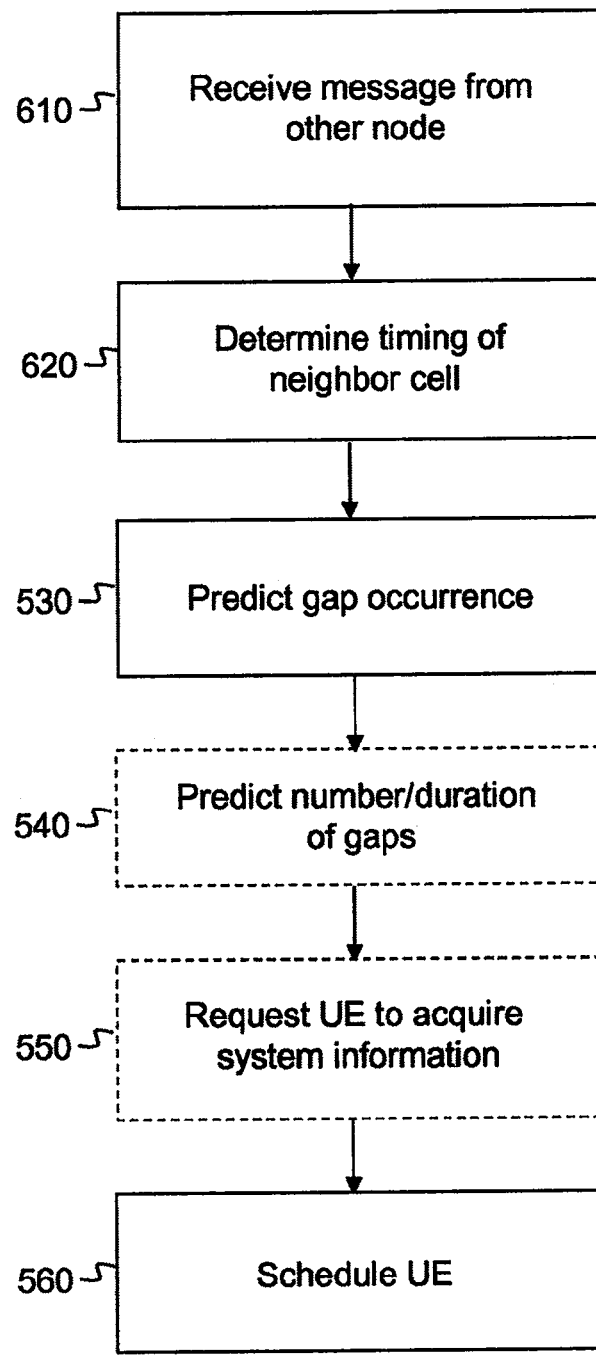
FIG. 6 is a flow chart illustrating a method in a network node according to some embodiments.

A further embodiment of a method in a network node for scheduling data transmission and/or reception will now be described with reference to FIG. 6. This embodiment is based on the embodiments described above with reference to FIG. 5. Thus, this method may also be executed in a network node 102, comprised within a wireless communication network 100 as shown in FIG. 2.

In a first step 610, the network node 102 receives a message from another network node. The message may for instance be received from the neighboring base station 122, from a positioning node, or from an O&M node residing within the wireless communication network 100. The message comprises information related to the timing of the neighboring base station 122, e.g. frame start timing, SFN, relative time difference between the serving cell 110 and neighbor cell 120, or any other data that may be used to derive the neighbor cell timing. In one variant, the message is a positioning-related message.

The serving network node 102 then proceeds to step 620, where it determines timing information for the neighbor cell 120 based on the message received in step 610. The determined timing information comprises the frame start timing and/or the System Frame Number, SFN of neighbor cell 120.

Once the serving network node 102 has determined the timing of neighboring base station 122, it proceeds to predicting one or more gap occurrences in step 530, and scheduling the UE in a time period not overlapping with any predicted gap occurrence in step 560. Optionally, the serving network node 102 may also perform steps 540 and/or 550. Steps 540-560 may be performed in the same way as described in connection with FIG. 5 above.

A method in a network node for scheduling data transmission and/or reception according to an embodiment of the invention will now be described, with reference to the scenario of FIG. 2 and the flowchart in FIG. 7. This embodiment predicts autonomous gap occurrences based on HARQ ACK/NACK feedback from a UE.

The method may be executed in network node 102, comprised within a wireless communication network 100 as shown in FIG. 2. The network node 102 may for instance be an E-UTRAN eNodeB, or an UTRAN NodeB. The network node 102 serves a cell 110, and within this cell three user equipments 104, 106, 108 are located.

Figure 7:
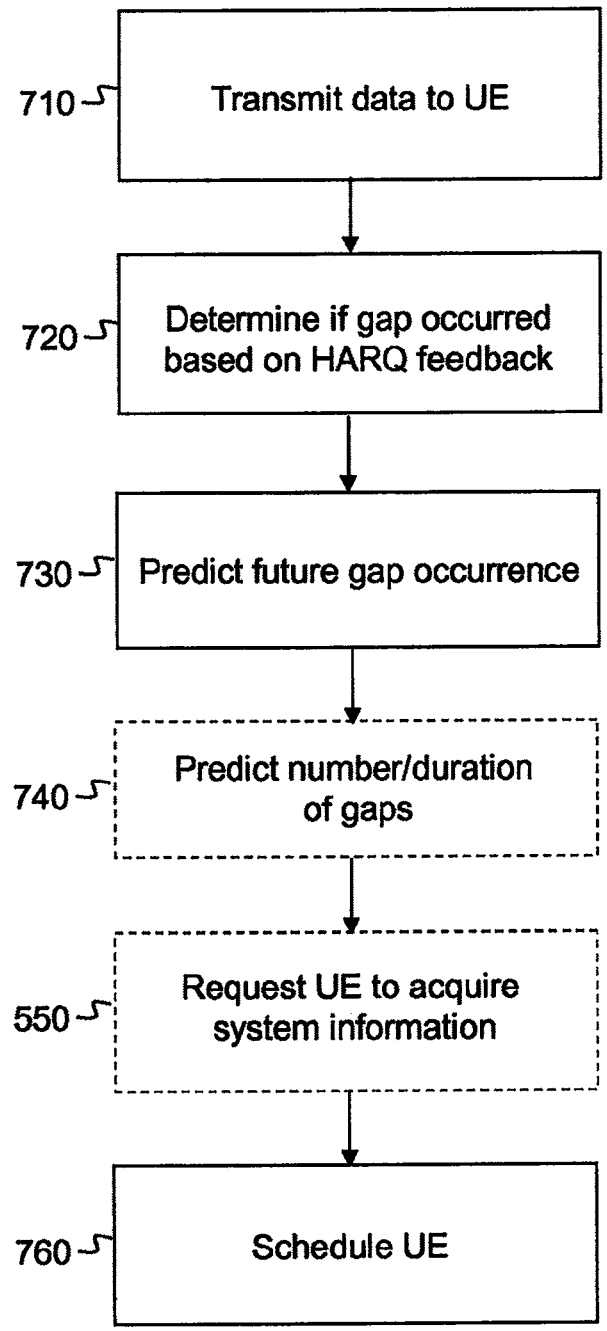
FIG. 7 is a flow chart illustrating a method in a network node according to some embodiments.

Referring now to FIG. 7, in step 710 the network node 102 transmits data to user equipment 104, which is located within cell 110 and being served by network node 102.

The transmission of data occurs in a time period when the network node 102 knows or suspects that UE 104 is attempting to acquire system information from the neighboring base station 122. For instance, in an E-UTRAN system the transmission of data in step 710 may take place during the 200 ms period when UE 104 is acquiring the CGI of neighboring base station 122 following a request from the serving network node 102.

In a variant of this embodiment, the network node 102 transmits dummy data to the UE in step 710 to check whether the said UE is currently using autonomous gaps or not for measuring the target cell's CGI, i.e. the transmission does not contain any real data destined for the UE. For instance, in E-UTRAN the network node 102 may schedule dummy data on PDSCH to UE 104. This may be advantageous in a situation where the network node 102 does not currently have any data pending for transmission to the UE 104.

In step 720, network node 102 determines whether an autonomous gap occurrence was used by UE 104 during the time period of the transmission in step 710. This determination is based on whether the radio network node 102 receives HARQ NACK/ACK feedback for the transmitted data.

As explained earlier, the HARQ ACK/NACK sent by the UE 104 to the serving network node 102 in response to the transmission in step 710 may reveal whether the autonomous gaps are currently employed by the UE 104 or not. In particular, if the UE does not respond to downlink transmission from the serving network node 102 in terms of ACK/NACK feedback, the serving network node 102 may assume that an autonomous gap occurrence is being used by the UE 104 for decoding system information, such as the CGI of neighbor cell 120. Similarly, if the UE 104 sends an ACK/NACK response to a downlink transmission, then the network node 102 may assume that the UE 104 is not currently creating an autonomous gap occurrence, and hence the network, if needed, may continue scheduling the UE 104.

Based on the information about past or current gap occurrences which was determined in step 720, the network node 102 predicts in step 730 at least one autonomous gap occurrence in which its served UEs will autonomously create gaps for acquiring system information from neighboring base station 122. That is to say, the network node 102 predicts that the future gap occurrences will correspond to the past or current gap occurrences. For example, in an E-UTRAN scenario where the UE 104 is acquiring the ECGI from neighboring base station 122, the network node 102 may predict that the next gap occurrence will occur 40 ms from the last detected gap occurrence, since in E-UTRAN the ECGI is transmitted with a periodicity of 40 ms.

In some variants, the network node 102 may also predict the duration and/or length of the autonomous gaps based on the HARQ ACK/NACK feedback in a step 740. For example, the network node 102 may determine the duration and/or number of times when the UE 104 did not provide any HARQ feedback, and then predict that the same or a similar duration and/or number of gaps will also apply to future autonomous gap occurrences. As an example, the network node 102 may repeat steps 710 and 720 two or more times to obtain more detailed information as to the duration of the gap and/or the number of occasions. If the network node 102 has access to UE capability information, this information may also be used to better predict the duration and/or number of gaps required by the UE 104, as described in connection with previous embodiments.

In other variants, the duration and/or number of the gaps may be preconfigured, e.g. the duration may be assumed to be 2-4 subframes and the number of gaps may be assumed to be all possible gap occurrences, as described above.

In some variants of this embodiment, the network node 102 performs step 550, wherein the network node 102 requests a user equipment to acquire system information from the neighboring base station. This step may be performed in a way similar to that described in connection with previous embodiments.

In step 760, network node 102 schedules a user equipment for data transmission and/or reception in a time period which does not overlap with any of the autonomous gap occurrence which were predicted in step 730. According to one variant, the UE is scheduled only in time periods which do not coincide with any predicted gap occurrence.

In a particular variant of this embodiment, the network node 102 collects statistics of the HARQ ACK/NACK feedback, i.e. interruption in ACK/NACK when UE 104 decodes system information such as CGI. This essentially corresponds to performing steps 710 and 720 multiple times, and possibly for different user equipments. The network node 102 uses the statistics to determine the pattern of the autonomous gaps created by the UE 104 while the UE decodes system information, e.g. CGI, of a target cell 120 under a certain target cell SNR. A more precise pattern of gaps can be determined by the serving node 102 by combining the target cell SNR (e.g. RSRQ as explained above) and the HARQ ACK/NACK statistics. Such a pattern based on the statistics and target cell SNR can be used by the network node 102 in the future when performing scheduling while the UE 104 acquires system information, e.g. the CGI, of the target cell 120.

Similarly to previous embodiments, it is pointed out that the user equipment to be scheduled in step 760 could be the UE 104, i.e. the UE that the network node transmitted data to in step 610, but it could also be any other UE served by the network node 102, provided that the network node 102 is aware that the UE is currently in a measurement period during which it is attempting to acquire system information from the neighboring base station 122 using autonomous gaps. That is to say, HARQ ACK/NACK feedback acquired from one or more UEs may be used to predict autonomous gap occurrences for other UEs which are acquiring system information from neighbor cell 120, in particular for UEs having similar receiver capabilities.

The present embodiment may be combined in various ways with any of the previously described embodiments. As mentioned above, the HARQ ACK/NACK feedback information or statistics described in this embodiment may be combined with SNR and/or UE capability information. Furthermore, the network node 102 may determine the timing of neighbor cell 120 in any of the ways described above, and combine this information with HARQ feedback data or statistics to make the prediction of autonomous gap occurrences even more accurate.

A method in a network node for scheduling data transmission and/or reception according to an embodiment of the invention will now be described, with reference to the scenario of FIG. 2 and the flowchart in FIG. 8. This embodiment predicts autonomous gap occurrences based on CSI feedback reports from a UE.

In prior art, the serving network node 102 may configure a UE 104 to periodically report one or more types of channel state information (CSI), which reveals downlink channel or radio conditions. These measurements are done over the downlink signals from the serving cell 110 and reported to the serving radio network node 102, which in turn uses this for various purposes such as for scheduling, resource allocation, link adaptation, antenna selection in case of MIMO, rank adaptation in case of MIMO etc. Examples of CSI are channel quality indicator (CQI), pre-coding matrix index (PMI), rank indicator (RI) etc.

The method may be executed in network node 102, comprised within a wireless communication network 100 as shown in FIG. 2. The network node 102 may for instance be an E-UTRAN eNodeB, or an UTRAN NodeB. The network node 102 serves a cell 110, and within this cell three user equipments 104, 106, 108 are located.

Figure 8:
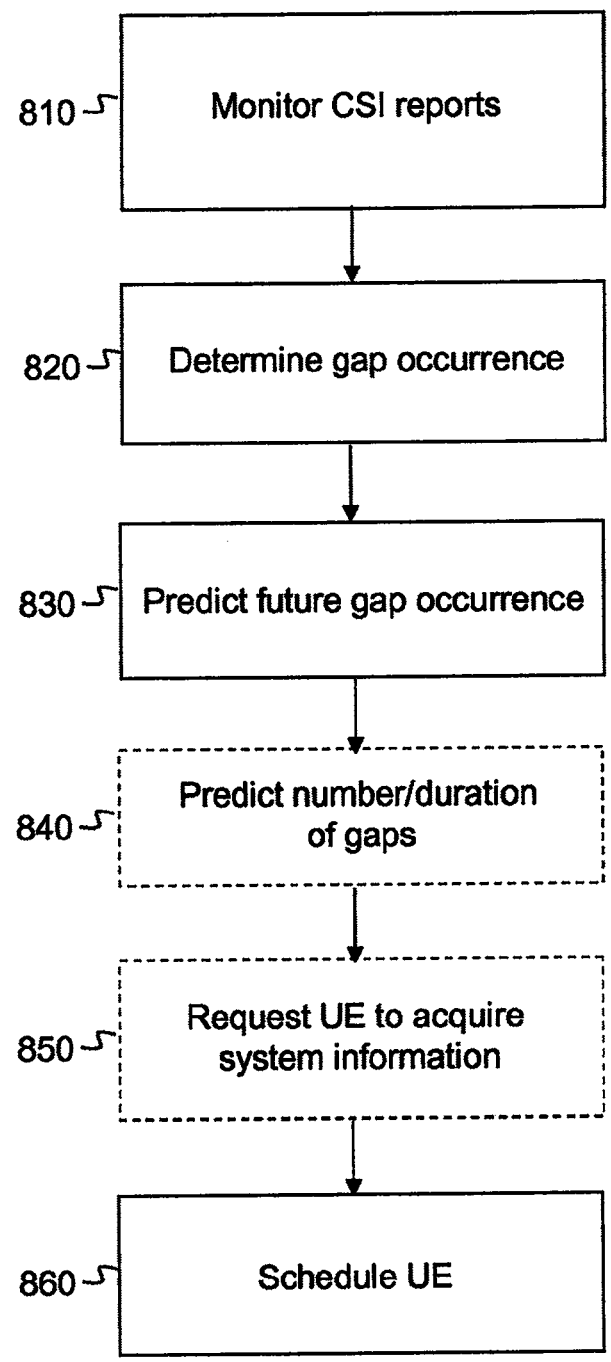
FIG. 8 is a flow chart illustrating a method in a network node according to some embodiments.

Referring now to FIG. 8, in step 810 the network node 102 monitors received reports of Channel State Information, CSI, from a user equipment 104, which is served by the network node 102 and which is currently attempting to acquire system information from the neighboring base station 122.

In some variants of this embodiment, the serving network node 102 starts monitoring the CSI reporting pattern from the UE 104 after requesting the UE 104 to acquire the target cell's 120 system information, e.g. CGI.

In step 820, the network node 102 determines whether an autonomous gap occurrence was created by the user equipment 104, based on the presence or absence of a CSI report in the time period during which the network node 102 is monitoring received CSI reports. That is to say, if the network node 102 receives a CSI report it may assume that the UE 104 was not using an autonomous gap occurrence in the time instance when the CSI report was generated, and conversely if the network node 102 does not receive a CSI report when expected, the network node 102 may infer that the UE 104 was prevented from sending a CSI report because of an autonomous gap occurrence.

Based on the information about past or current gap occurrences which was determined in step 820, the network node 102 predicts in step 830 at least one autonomous gap occurrence in which its served UEs will use autonomously created gap occurrences for acquiring system information from neighboring base station 122. That is to say, the network node 102 predicts that the future gap occurrences will correspond to the past or current gap occurrences.

In some variants, the duration and/or number of the autonomous gaps may be preconfigured, i.e. the duration may be assumed to be 2-4 subframes and the number of gaps may be assumed to be all possible gap occurrences, as described above. In other variants, the duration and/or number of gaps is predicted, for instance based on the presence or absence of several CSI reports. The duration and/or number of gaps may also be determined in any of the ways described above, e.g. based on SNR, UE receiver capability, etc.

In step 860, network node 102 schedules a user equipment for data transmission and/or reception in a time period which does not overlap with any of the autonomous gap occurrences which were predicted in step 830. According to one variant, the UE is scheduled only in time periods which do not coincide with any predicted gap occurrence.

In some variants of this embodiment, the network node 102 collects statistics of the CSI reporting interruptions, and uses these statistics to determine the pattern of the autonomous gaps created by the UE 104 while the said UE decodes the system information, e.g. CGI, of a target cell 120 under certain target cell's SNR. A more precise pattern of gaps can be determined by the serving node 102 by combining the target cell SNR (e.g. RSRQ as explained above) and the CSI interruption statistics. Such a pattern based on the CSI interruption statistics and target cell SNR may be used by the network node 102 in the future when performing scheduling while the UE 104 acquires the CGI of the target cell.

The present embodiment may be combined in various ways with one or more of the previously described embodiments to obtain more detailed or accurate information about the timing, duration and/or number of gaps. For example, the CSI interruption statistics may be combined with one or more of neighbor cell timing, UE capability information, and/or neighbor cell SNR measurements, which may all be determined as described above.

Figure 9:
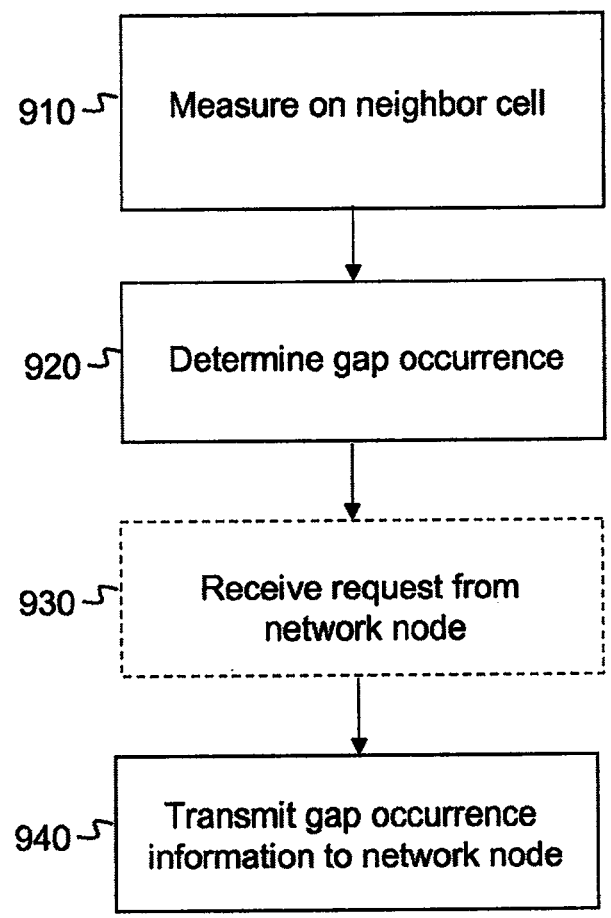
FIG. 9 is a flow chart illustrating a method in a user equipment according to some embodiments.

A method in a user equipment according to an embodiment of the invention will now be described, with reference to the scenario of FIG. 2 and the flowchart in FIG. 9. In this embodiment, an explicit message is sent from the UE, comprising information about a past or current autonomous cap occurrence. The serving network node may use this information to predict future autonomous gap occurrences.

The method is executed in a user equipment 104, comprised within a wireless communication network 100 as shown in FIG. 2, and being served by a radio network node 102. The serving radio network node 102 may be an E-UTRAN eNodeB, an UTRAN NodeB or an UTRAN RNC.

In a step 910, the user equipment 104 performs a measurement on a signal received from a neighboring base station 122. In one variant the step of performing a measurement comprises reading system information, such as the Cell Global Identifier, CGI, of the neighboring base station 122.

In step 920, the user equipment 104 determines, based on the measurement, at least one autonomous gap occurrence during which the user equipment will autonomously create gaps for acquiring system information, e.g. CGI, from the neighboring base station 122.

In some variants of this embodiment, the serving radio network node 102 explicitly requests the UE 104 to supply information about the autonomous gap occurrence, and the UE 104 receives this request in a step 930. However, it is also possible for the UE to proceed directly from step 920 to step 940 without receiving any request from the network node. Furthermore, it should be noted that the request from the network node may also be received before step 910 is performed, or alternatively between steps 910 and 920.

In step 940, the user equipment 104 transmits information to the network node 102 indicating the at least one autonomous gap occurrence. For example, the information indicating the autonomous gap occurrence may comprise at least one of the starting time or subframe, the number of gaps, the duration of each gap and the total duration to acquire the system information. In a particular variant of this embodiment, the information about the autonomous gap occurrence signalled by the UE 104 in step 940 corresponds to the actual autonomous gap occurrence which was used by the UE 104 for acquiring the system information of the neighbouring base station 122. The information about the autonomous gap occurrence signalled by the user equipment also includes an identifier of the neighbouring base station, e.g. CGI and/or PCI.

In a variant of this embodiment, the information about the autonomous gap occurrence is separately reported by the user equipment to the network node 102 for gaps created in the uplink and downlink. An advantage of this approach is that the user equipment may report the information about the autonomous gap occurrence anytime, without waiting for the normal measurement reporting instances.

According to some variants, the information about the autonomous gap occurrence is signalled by the UE 104 when reporting measurements such as downlink signal quality, downlink signal strength, physical cell identity or global cell identity etc. This approach has an advantage of reduced signalling overhead, since the information about the gap occurrence is piggybacked with the normal measurement reports.

The information transmitted to the network node 102 in step 940 enables the network node 102 to make predictions about future gap occurrences for this UE or other served UEs. The reported information about the autonomous gap occurrence may also be used by the network to perform site planning and/or setting radio parameters, such as the transmitted power in the base station. For examples the network can increase the transmit power level of a base station which generally requires user equipments to create more gaps than a certain threshold for acquiring its SI. The increase in the base station's transmitted power level may improve the SINR experienced by the user equipment, thereby reducing the length of the measurement period required for acquiring the SI of the base station.

Figure 10:
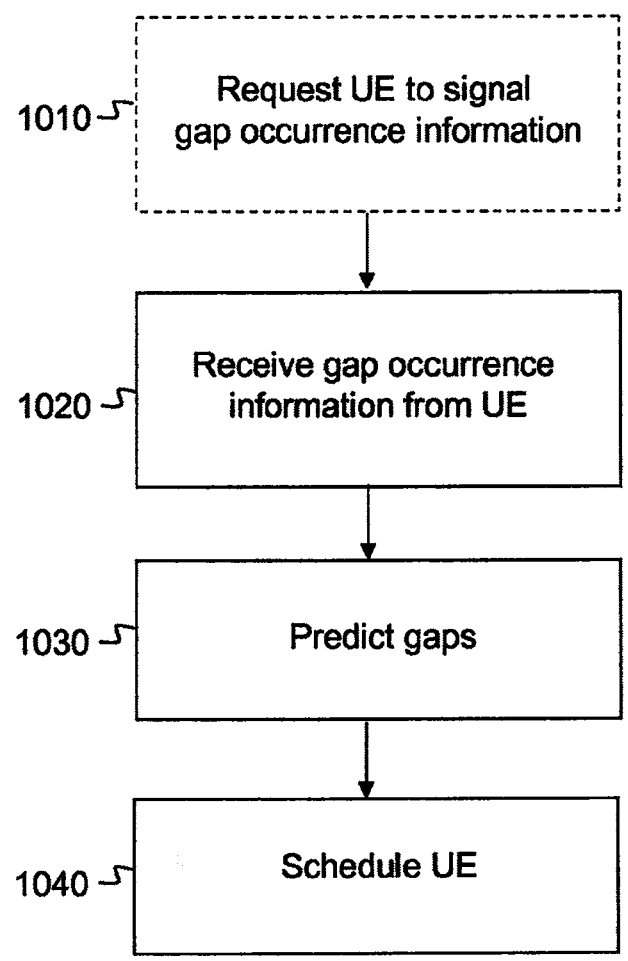
FIG. 10 is a flow chart illustrating a method in a network node according to some embodiments.

A method in a radio network node for scheduling data transmission and/or reception according to an embodiment of the invention will now be described, with reference to the scenario of FIG. 2 and the flowchart in FIG. 10. In this embodiment, the radio network node receives an explicit message from the UE, comprising information about a past or current autonomous cap occurrence, and uses this information to predict future autonomous gap occurrences.

The method is executed in a radio network node 102, comprised within a wireless communication network 100 as shown in FIG. 2. The radio network node 102 serves a user equipment 104. The serving radio network node 102 may be an E-UTRAN eNodeB, an UTRAN NodeB or an UTRAN RNC.

In step 1020, the network node 102 receives information from the user equipment (104) indicating at least one autonomous gap occurrence, during which the user equipment 104 will autonomously create gaps for acquiring system information from a neighboring base station 122. For example, the information indicating the at least one autonomous gap occurrence may comprise one or more of: the starting point of the gap occurrence, e.g. in the form of a subframe number, the end point or duration of a gap occurrence, and the number of gap occurrences used during a system information measurement period. In some variants, the information indicating the autonomous gap occurrence is received in conjunction with a measurement report from the user equipment 104, for instance a neighbor cell report.

In step 1030, the network node 102 predicts at least one autonomous gap occurrence in which user equipments served by the radio network node 102 will use autonomously created gaps for acquiring system information from the neighboring base station 122. The prediction is based on the information received in step 1020, i.e. the network node 102 assumes that future gap occurrences will follow the same pattern as the gap occurrence indicated in step 1020. In some variants, the prediction may be further improved by combining this method with any of the previously described embodiments. For instance, timing information related to neighboring base station 122 may be obtained and used to predict the starting point of the gaps. Furthermore, UE receiver capability information, SNR, or other metrics may be used to more accurately predict the duration and/or number of autonomous gaps. It is also possible to combine the present embodiment with information gathered from HARQ/NACK feedback report, or CSI reporting patterns, as already explained above.

In step 1040, the network node 102 schedules a user equipment for data transmission and/or reception in a time period which does not overlap with any predicted autonomous gap occurrence. It should be noted, as for previous embodiments, that the UE to be scheduled may be the user equipment 104, or another UE which is acquiring system information from the neighboring base station 122.

In some variants of this embodiment, a further step 1010 is performed before step 1020. In step 1010, the network node 102 requests the user equipment 104 to signal the information indicating the at least gap occurrence.

As stated earlier, all of the above embodiments may also be used to determine the autonomous gaps which are created by the UE for reading the target cell system information when UE is in DRX state. In E-UTRAN the DRX cycles may range from 10 ms to 2.56 seconds.

The network may configure the UE with a DRX cycle such that the DRX ON period does not coincide or overlap with the scheduling of system information (SI), especially the MIB and required SIB (e.g. SIB1 in E-UTRAN when reading the CGI), which are to be read by the UE, in the target cell. This will ensure that the UE does not create autonomous gaps during the DRX ON periods of the DRX cycle, since these gaps are meant to read the SI. The UE opens its receiver for the reception of the data from the serving cell during the DRX ON period, which may comprise between a few OFDM symbols up to few sub-frames in E-UTRAN.

For instance, the periods when the SI is being transmitted in the target cells, i.e. the periods when autonomous gap occurrences may be used, may be determined using any of the methods described above. Accordingly, the DRX cycle is configured to avoid conflict between the DRX ON period and the autonomous gaps. This can be easily achieved in a synchronous network since all the cells have the same transmit timing. However in an asynchronous network, the serving network node can set the DRX cycle to avoid, to the extent possible, the conflict with the scheduling of the SI and thus with the potential autonomous gaps when the UE reads the SI. The network may also adjust the DRX cycle to avoid such a conflict with the scheduling of the SI at the target cell when the network node requests the UE to read the SI of the target cell. Another possibility is to use the same measurement period for decoding the CGI of the target cell in non DRX and for all DRX cycles, regardless of their length. This will ensure that the UE performs the CGI decoding in a shorter time, and thus the risk that the DRX ON period coincides with the autonomous gaps is minimized.

Thus, any of the previously described methods executed in a network node may comprise a further step of configuring the DRX cycle of the user equipment to be scheduled, such that the DRX ON periods do not overlap with any predicted autonomous gap occurrence. In a further variant, the same duration is used for acquiring the system information of the neighbouring base station regardless whether DRX is used or not, and regardless of the length of the DRX cycle when DRX is used.

Figure 11:
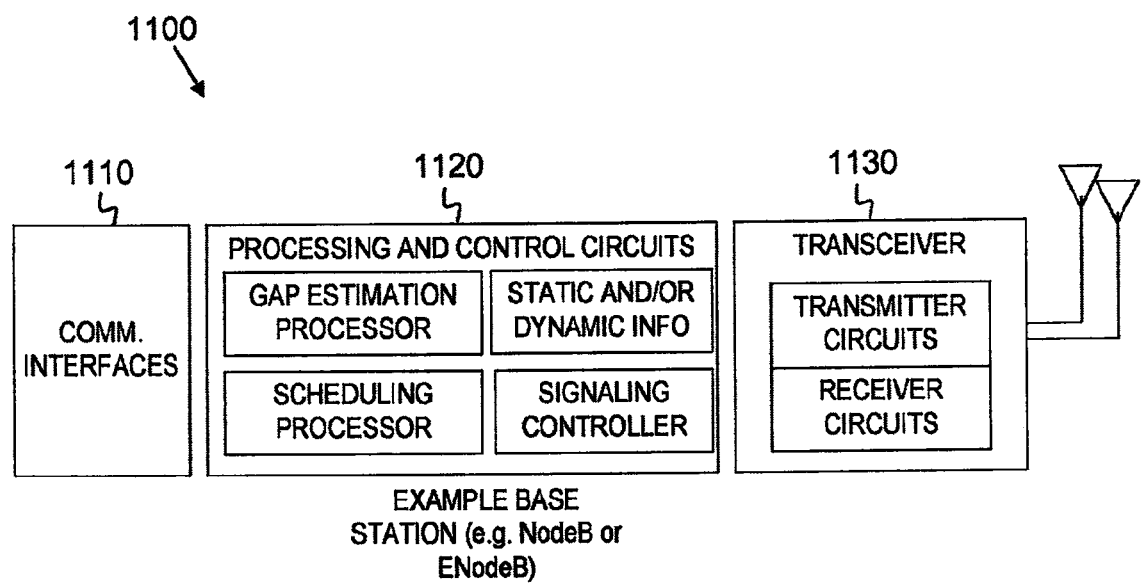
FIG. 11 is a schematic block diagram illustrating a base station.

FIG. 11 is a block diagram of a base station 1100 according to particular embodiments of the invention. The example base station provides a non-limiting illustration of communication and processing circuits used in carrying out the network-side of the present invention in one or more embodiments. However, it should be noted that other network nodes may be involved.

Further, those of ordinary skill in the art will appreciate that the example base station may well include elements not shown in the simplified illustration—e.g., additional communication interfaces and processing/control circuitry.

Those of ordinary skill in the art will also appreciate that the base station may be implemented using fixed and/or programmable circuitry. In one embodiment, the apparatus includes one or more microprocessors, digital signal processors, or other digital processing circuits, along with associated program and data memory. As such, the term "circuitry" should be understood as encompassing discrete electronic circuits and/or integrated electronic circuits (whether fixed or programmable).

For example, in the illustration, the apparatus 1100 comprises one or more processing circuits 1120 that are configured to implement at least some of the network-side processing disclosed herein for the present invention. Those one or more processing circuits—e.g., the signalling control circuitry, the gap estimation processor, and the scheduling processor—may be at least partly implemented using programmable digital processing circuits. For example, these functions may be implemented in one or more microprocessors, signal processors, or other computer circuits.

In a particular example, the base station's processing circuits 1120 are configured to implement the gap timing estimation and corresponding scheduling controls based on the execution of stored computer program instructions. In that regard, it will be appreciated that these base station processing circuits 1120 are specially adapted or otherwise configured to carry out the processing disclosed herein, irrespective of whether they comprise fixed or programmable circuitry, or any mix thereof. It will also be appreciated that the base station 1100 includes or has access to memory or another computer-readable medium, for storing configuration and operating data, which can include information at least some of the static/semi-static and dynamic information described herein—some static information may be provisioned or otherwise pre-stored in the base station for its use during operation.

In one embodiment, the illustrated base station 1100, or variations of it, is configured to implement a method of improved data scheduling comprising:

determining timing information regarding gaps in service with the user equipment, as caused by the user equipment measuring system information for a neighboring target cell; and adapting scheduling of data transmissions to or from the user equipment as a function of the determined timing information.

In one embodiment, said determining comprises estimating, calculating, or otherwise predicting the timing, number, period, or other characteristics of such gaps, based on static or semi-static information. Such information comprises knowledge of transmission frame/sub-frame start timing in the neighboring cells, the scheduling of such information in the neighboring cells, the user equipment's capabilities, e.g., as regards its measurement of such information, etc. Further, the determination accuracy is enhanced in one or more embodiments, by basing the determination on dynamic information, such as signal qualities, timing differences, etc.

In another embodiment, the one or more processing circuits 1120 are configured to predict at least one autonomous gap occurrence in which user equipments served by the radio network node 1100 will use autonomously created gaps for acquiring system information from a neighboring base station and during which the UE is not able to receive data from, and/or transmit data to, the radio network node, and further configured to schedule a user equipment for data transmission and/or reception in a time period which does not overlap with any predicted autonomous gap occurrence. In a variant of this embodiment, the one or more processing circuits 1120 are further configured to request the user equipment to read system information from the neighboring base station.

In a further variant, the one or more processing circuits 1120 are further configured to determine when the neighboring base station transmits system information. For example, the one or more processing circuits 1120 may be configured to determine timing information for the neighbouring base station, the timing information comprising at least one of frame start timing and the System Frame Number, SFN. In a variant, the one or more processing circuits 1120 are further configured to determine timing information based on a measurement report received from a reporting user equipment, which is served by the radio network node, and wherein the measurement report relates to the neighboring base station. In a further variant, the one or more processing circuits 1120 are configured to determine the frame start timing and the SFN are determined based on a message received from another network node. In an alternative variant, the one or more processing circuits 1120 are configured to determine the timing information by performing correlation over a pre-defined set of synchronization and/or pilot signals transmitted by the neighbouring base station. In some variants, the one or more processing circuits 1120 are further configured to predict the duration and/or number of autonomous gap occurrences. For instance, the one or more processing circuits 1120 may be configured to predict the duration and/or number of autonomous gap occurrences based on the downlink signal strength or quality of the base station reported by the reporting user equipment. Furthermore, the one or more processing circuits 1120 may be configured to predict the duration and/or number of autonomous gap occurrences based on the time required by the reporting user equipment to identify the physical layer identity of the neighbouring base station. The one or more processing circuits 1120 may also be configured to predict the duration and/or number of autonomous gap occurrences based on the receiver capability of the reporting user equipment. Furthermore, the one or more processing circuits 1120 may be configured to predict the duration and/or number of autonomous gap occurrences based on whether the serving radio radio network node and the neighboring base station operate on the same or different carrier frequencies. Alternatively, the duration and/or number of autonomous gap occurrences may be preconfigured. For instance, the preconfigured duration of the autonomous gap occurrences may be between 2 and 4 subframes. The number of autonomous gap occurrences may be configured to be the maximum number of autonomous gap occurrences possible within a measurement period.

In some variants, the one or more processing circuits 1120 are configured to transmit data during a certain time period to a user equipment, which is served by the radio network node and which has been requested to read system information from the neighboring base station. Furthermore, the one or more processing circuits 1120 are configured to determine, based on whether the radio network node receives HARQ NACK/ACK feedback for the transmitted data, whether an autonomous gap occurrence was used in the certain time period. In some variants, the one or more processing circuits 1120 are configured to transmit dummy data during the certain time period.

In some variants, the one or more processing circuits 1120 are configured to monitor the received reports of Channel State Information, CSI, from a user equipment, which is served by the radio network node and which has been requested to read system information from the neighboring base station. Furthermore, the one or more processing circuits 1120 are configured to determine whether an autonomous gap occurrence was created by the user equipment, based on the presence or absence of a CSI report in a certain time period.

In some variants, the one or more processing circuits 1120 are further configured to configure the DRX cycle of the user equipment to be scheduled such that the DRX ON periods do not overlap with any predicted autonomous gap occurrence. In some variants, the one or more processing circuits 1120 are configured to use the same measurement period for acquiring the system information of the neighbouring base station regardless whether DRX is used or not and regardless of the length of the DRX cycle when DRX is used.

In yet another embodiment, the one or more processing circuits 1120 are configured to receive information from a user equipment being served by the radio network node 1100, the information indicating at least one autonomous gap occurrence, during which the user equipment will autonomously create gaps for acquiring system information from a neighboring base station, and further configured to predict at least one autonomous gap occurrence in which user equipments served by the radio network node 1100 will use autonomously created gaps for acquiring system information from the neighboring base station. Furthermore, the processing circuits 1120 are configured to schedule a user equipment for data transmission and/or reception in a time period which does not overlap with any predicted autonomous gap occurrence. In some variants, the one or more processing circuits 1120 are further configured to request the user equipment to signal the information indicating the at least gap occurrence.

Figure 12:
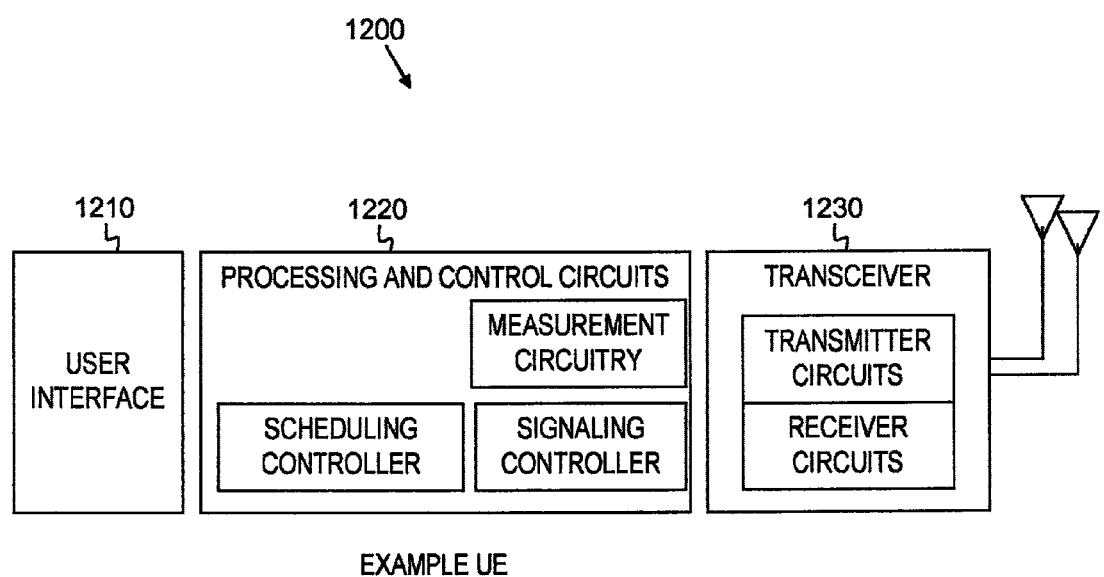
FIG. 12 is a schematic block diagram illustrating a user equipment.

FIG. 12 is a schematic block diagram illustrating an example item of user equipment, such as cellular telephone, smart phone, PDA, network modem card, or essentially any other wireless communication apparatus. One sees that the example UE 1200 includes a transceiver 1230 for receiving DL signals, i.e. control and data, from a supporting network, and for sending UL signals, i.e. control and data, to that network. One also sees various processing and control circuits 1220, for processing and responding to received control and data, and for generating control and data for transmission. In particular, the UE may include measurement circuitry for measuring various received signal parameters, and for obtaining system information from neighboring target cells.

Those ordinarily skilled in the art will appreciate that the UE 1200 of FIG. 11 may be implemented using fixed or programmable circuits, or both, and that in one or more embodiments, the UE 1200 includes one or more microprocessors, digital signal processors, or other such digital processing circuits, and that the UE 1200 may store computer program instructions, which, when executed, cause the UE 1200 to perform as described herein.

In one embodiment, the illustrated user equipment 1200, or variations of it, comprises one or more processing circuits 1220, configured to perform a measurement on a signal received from a neighboring base station, and to determine, based on the measurement, at least one autonomous gap occurrence during which the user equipment will autonomously create gaps for acquiring system information from a neighboring base station, and to transmit information to the radio network node serving the user equipment 1200, the information indicating the at least one autonomous gap occurrence.

In some variants, the one or more processing circuits 1220 are further configured to report the information about the autonomous gap occurrence separately for gaps created in the uplink and downlink.

In some variants, the one or more processing circuits 1220 are configured to signal the information about the autonomous gap occurrence when reporting measurements, such as downlink signal quality, downlink signal strength, physical cell identity or global cell identity etc.

In some variants, the one or more processing circuits 1220 are configured to signal the information about the autonomous gap occurrence when requested by the serving radio network node.

When using the word "comprise" or "comprising" it shall be interpreted as non-limiting, i.e. meaning "consist at least of".

This disclosure refers interchangeably to acquiring system information from a cell, or from a node (e.g. a NodeB or eNodeB). For completeness, it is pointed out that while the system information is transmitted from a physical node (e.g. NodeB or eNodeB), certain information, such as the CGI or E-CGI may be associated with a particular cell which is being served by that node. In particular, one base station may serve several cells or cell sectors, in which case the base station may transmit different system information in the various cells. Furthermore, a "neighboring base station" or "neighboring node" within the context of this disclosure should be understood as a base station or node which serves a neighboring cell. Thus, the physical base station or node does not necessarily need to be located in close proximity to the measuring user equipment.

The present invention is not limited to the above-describe preferred embodiments. Various alternatives, modifications and equivalents may be used. Therefore, the above embodiments should not be taken as limiting the scope of the invention, which is defined by the appending claims.

In particular, it should be noted that the embodiments of the invention in this disclosure apply to various scenarios such as for intra-frequency, inter-frequency, inter-RAT, e.g. when serving and target cells belong to E-UTRA FDD and TDD respectively or vice versa, or when serving and target cells belong to E-UTRA and UTRA respectively or vice versa. Furthermore, the embodiments described above apply to the UE, which is decoding system information such as the CGI of the target cell, when it is in DRX state as well as in non DRX state. In addition, the invention applies when autonomous gaps are used by the UE to acquire the system information of any type of target cell i.e. home base station, pico base station or any base station in a heterogeneous network environment. Also, the underlying aspects of the invention apply when the UE is acquiring the CGI of the target cell for any other purpose such as for automatic neighbor relation as part of a self organizing network (SON). Broadly, the principles of the invention apply to any case where a UE reads the system information of a neighbor cell or target cell for any purpose, and thereby creates gaps in the downlink and/or uplink service with the serving node.

The invention claimed is:

1. A method in a radio network node for scheduling data transmission or reception, the method comprising:
    predicting at least one autonomous gap occurrence in which user equipments served by the radio network node will use autonomously created gaps for acquiring system information from a neighboring base station and during which the user equipments are not able to receive data from the radio network node or are not able to transmit data to the radio network node, wherein predicting the at least one autonomous gap occurrence comprises determining when the neighboring base station transmits system information; and
    scheduling one or more of the user equipments for data transmission or reception in a time period that does not overlap with any predicted autonomous gap occurrence.

2. The method of claim 1, further comprising requesting one of the user equipments to read system information from the neighboring base station.

3. The method of claim 2, wherein the system information to be read comprises a Cell Global Identifier (CGI) of the neighboring base station.

4. The method of claim 1, wherein determining when the neighboring base station transmits system information comprises determining timing information for the neighboring base station, the timing information comprising at least one of frame start timing and the System Frame Number (SFN).

5. The method of claim 4, wherein the timing information is determined based on a measurement report received from a reporting one among the user equipments, and wherein the measurement report relates to the neighboring base station.

6. The method of claim 4, wherein the frame start timing and the SFN are determined based on a message received from another network node.

7. The method of claim 4, wherein the timing information is determined by performing correlation over a pre-defined set of synchronization or pilot signals transmitted by the neighboring base station.

8. The method of claim 1, further comprising predicting the duration or number of autonomous gap occurrences.

9. The method of claim 8, wherein the duration or number of autonomous gap occurrences is predicted based on the downlink signal strength or quality of the neighboring base station as indicated in a measurement report that relates to the neighboring base station and is received from a reporting user equipment among the user equipments that are served by the radio network node.

10. The method of claim 9, wherein the duration or number of autonomous gap occurrences are predicted based on the receiver capability of the reporting user equipment.

11. The method of claim 8, wherein the duration or number of autonomous gap occurrences are predicted based on the time required by a reporting user equipment to identify the physical layer identity of the neighboring base station, wherein the reporting user equipment is among the user equipments served by the radio network node and sends a measurement report relating to the neighboring base station.

12. The method of claim 8, wherein the duration or number of autonomous gap occurrences are predicted based on whether the serving radio network node and the neighboring base station operate on the same or different carrier frequencies.

13. The method of claim 1, wherein the duration or number of autonomous gap occurrences are preconfigured.

14. The method of claim 13, wherein the preconfigured duration of the autonomous gap occurrences is between 2 and 4 subframes.

15. The method of claim 13, wherein the number of autonomous gap occurrences is preconfigured to be the maximum number of autonomous gap occurrences possible within a measurement period.

16. The method of claim 1, further comprising configuring a Discontinuous Reception (DRX) cycle of the one or more user equipments to be scheduled such that DRX ON periods do not overlap with any predicted autonomous gap occurrence.

17. The method of claim 16, wherein the same measurement period is used for acquiring the system information of the neighboring base station regardless whether DRX is used or not and regardless of the length of the DRX cycle when DRX is used.

18. A radio network node comprising one or more processing circuits that are configured to:
- predict at least one autonomous gap occurrence in which user equipments served by the radio network node will use autonomously created gaps for acquiring system information from a neighboring base station and during which the user equipments are not able to receive data from the radio network node or transmit data to the radio network node, wherein predicting the at least one autonomous gap occurrence comprises determining when the neighboring base station transmits system information;
- schedule one or more of the user equipments for data transmission or reception in a time period which does not overlap with any predicted autonomous gap occurrence.

\* \* \* \* \*